(12) United States Patent
D'Agostini et al.

(10) Patent No.: US 7,950,737 B2
(45) Date of Patent: May 31, 2011

(54) MOTOR VEHICLE SEAT

(75) Inventors: Roberto D'Agostini, Piossasco (IT); Angelo Falchero, Turin (IT)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 12/250,657

(22) Filed: Oct. 14, 2008

(65) Prior Publication Data
US 2009/0102255 A1    Apr. 23, 2009

(30) Foreign Application Priority Data

Oct. 22, 2007   (IT) .............................. TO2007A0747

(51) Int. Cl.
*B60N 2/42*   (2006.01)
*B60R 21/00*   (2006.01)

(52) U.S. Cl. ................................................ 297/216.12
(58) Field of Classification Search ............. 297/216.12, 297/284.4, 216.1, 216.13
See application file for complete search history.

(56) References Cited

U.S. PATENT DOCUMENTS

| | | | | |
|---|---|---|---|---|
| 6,719,368 B1 * | 4/2004 | Neale | ...................... | 297/216.14 |
| 6,749,256 B1 * | 6/2004 | Klier et al. | ................ | 297/216.12 |
| 6,789,846 B2 * | 9/2004 | Humer et al. | ............ | 297/216.12 |
| 7,044,544 B2 | 5/2006 | Humer et al. | | |
| 2006/0261653 A1 * | 11/2006 | McMillen et al. | .......... | 297/284.4 |
| 2009/0001785 A1 * | 1/2009 | Swan et al. | .............. | 297/216.12 |

* cited by examiner

*Primary Examiner* — Milton Nelson, Jr.
(74) *Attorney, Agent, or Firm* — Brooks Kushman P.C.

(57) ABSTRACT

A vehicle seat (1) having an active headrest mechanism (20) actuated by a lower lumbar mechanism (30). A seat back frame (10) mounts the active headrest mechanism (20) and the lower lumbar mechanism (30).

52 Claims, 14 Drawing Sheets

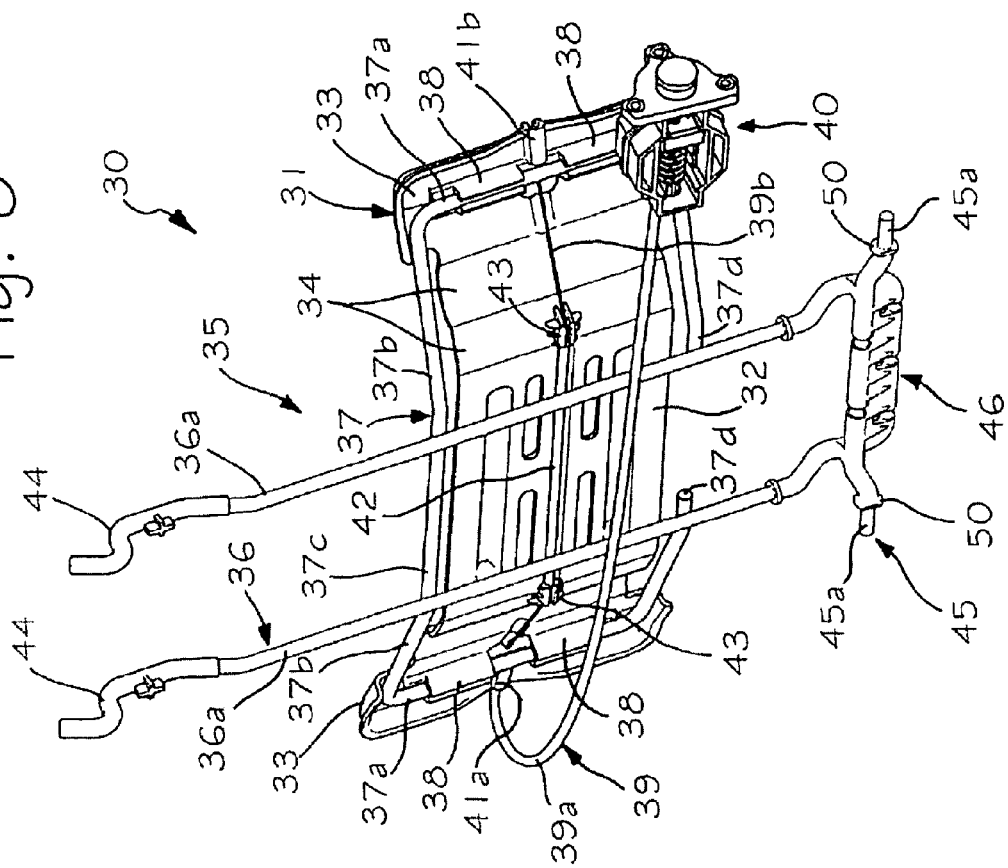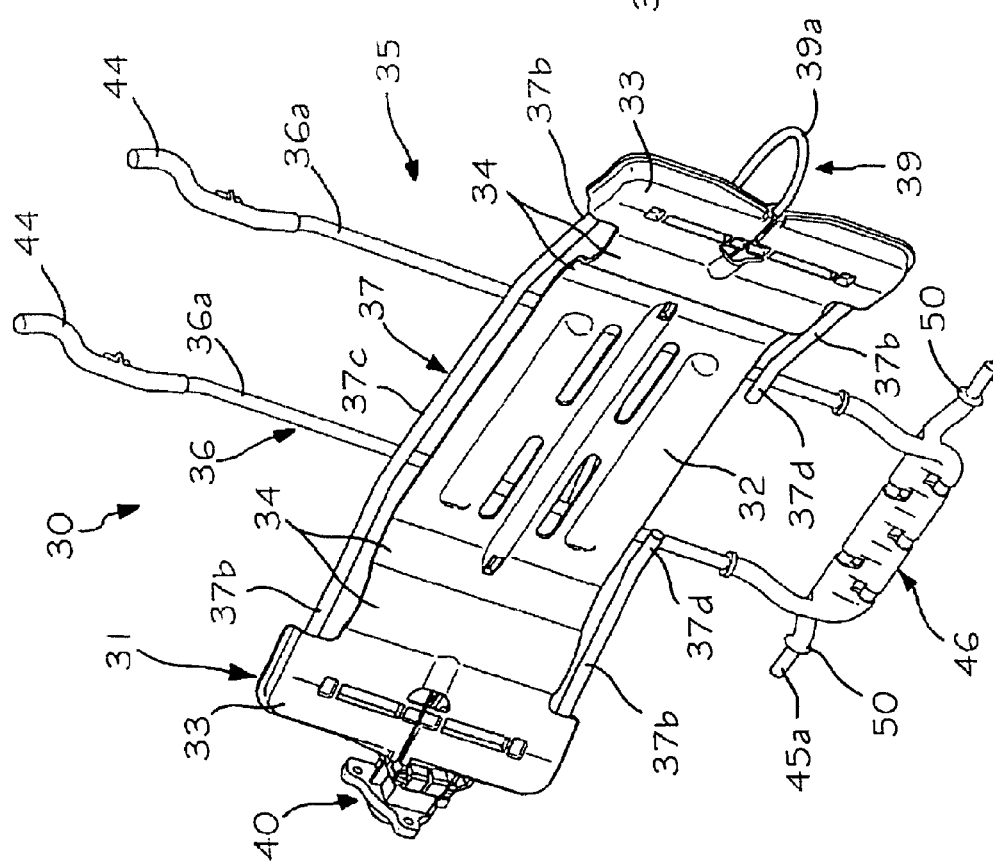

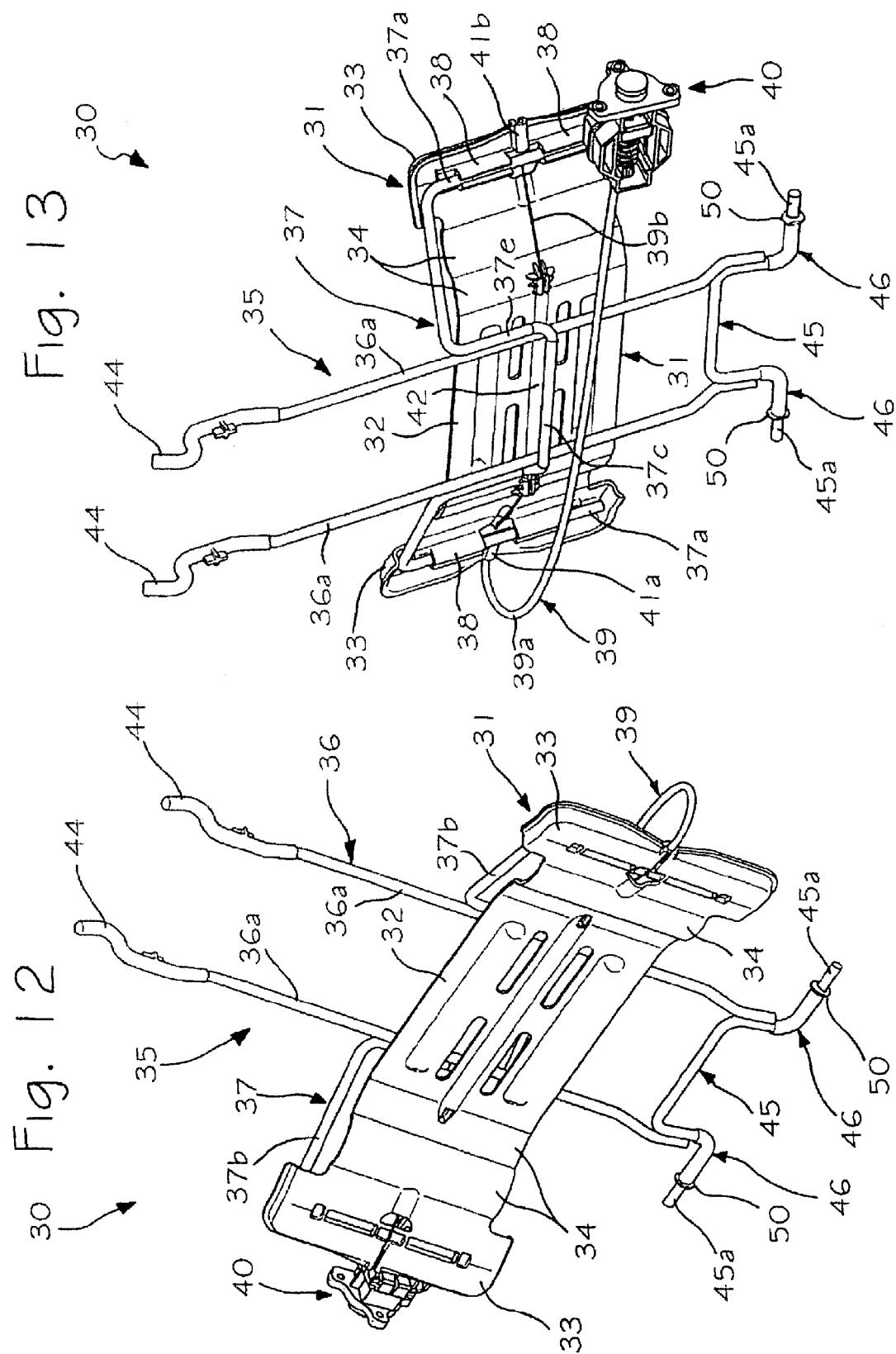

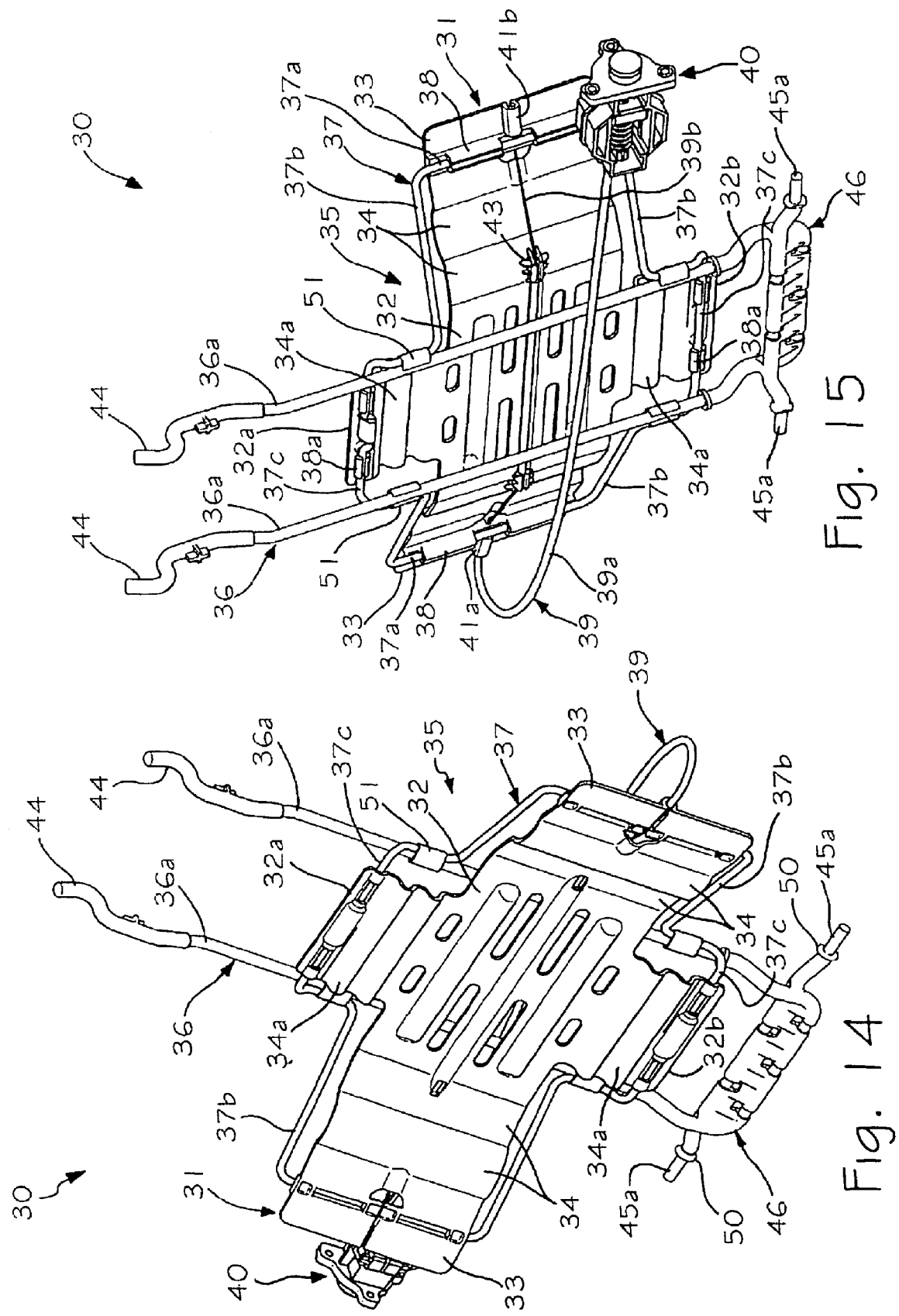

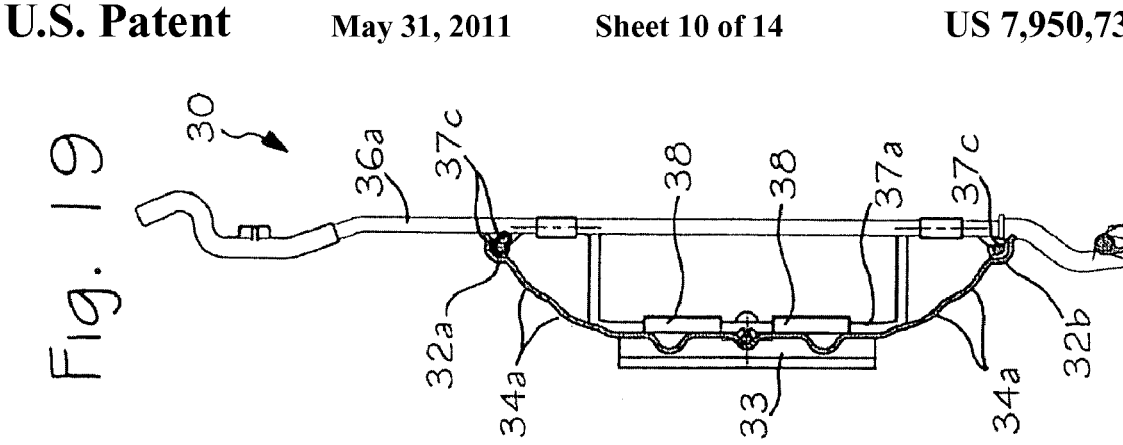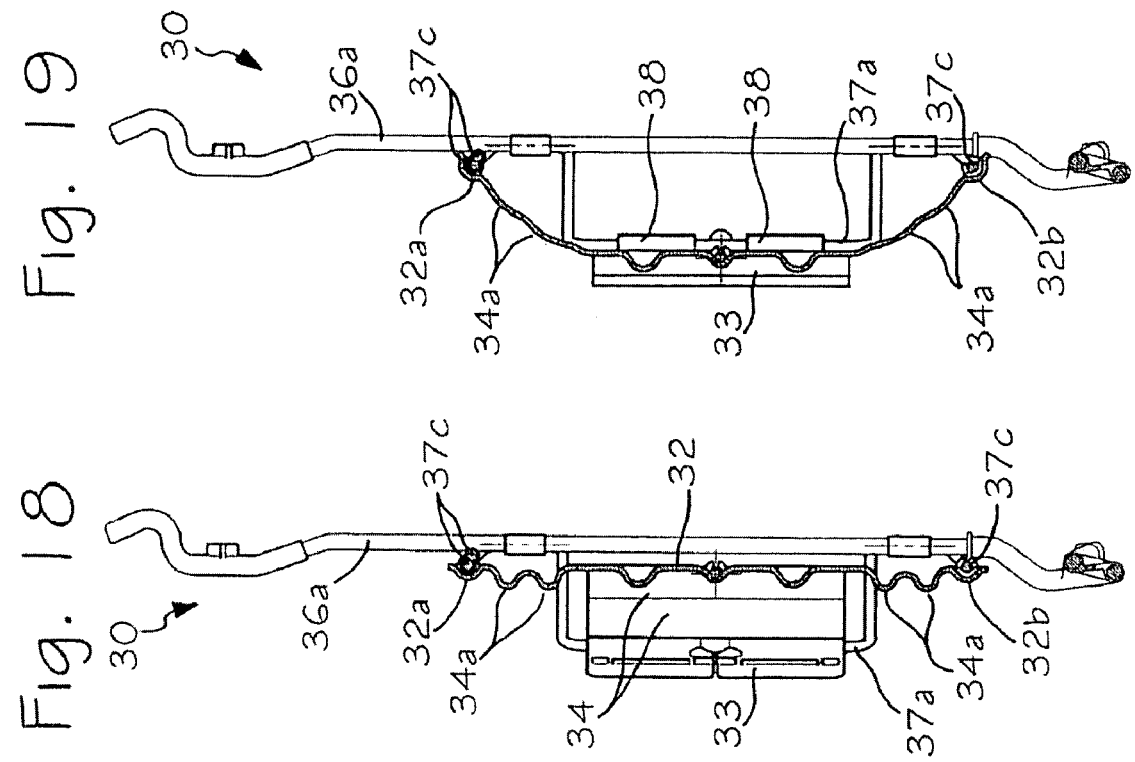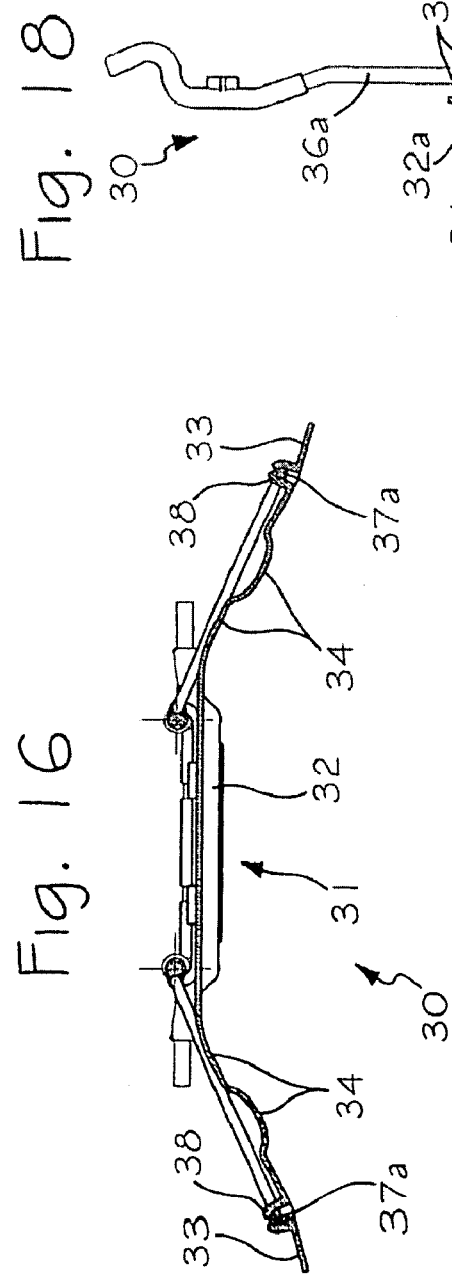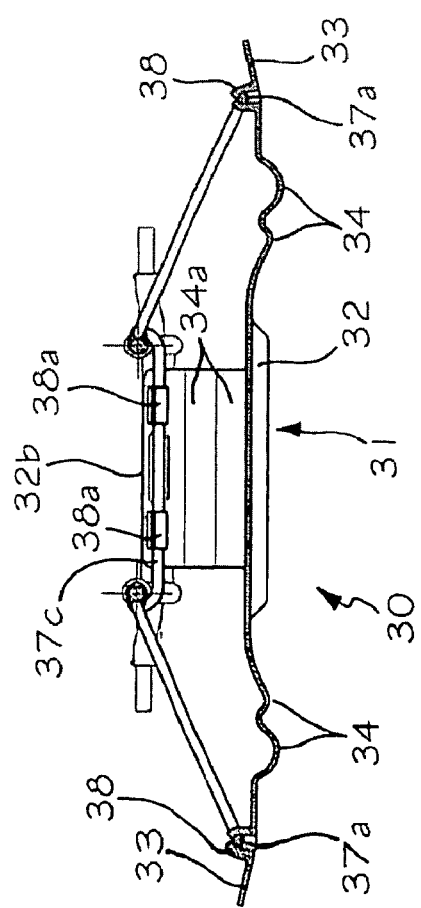

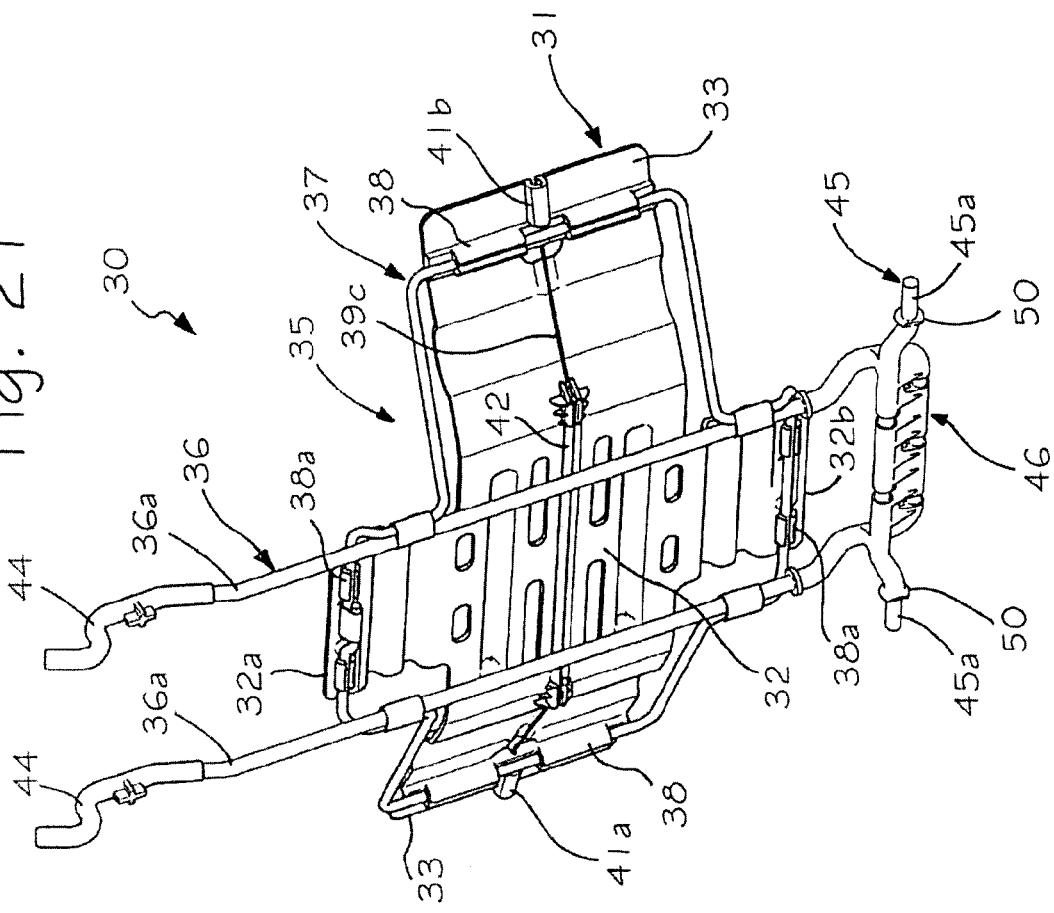
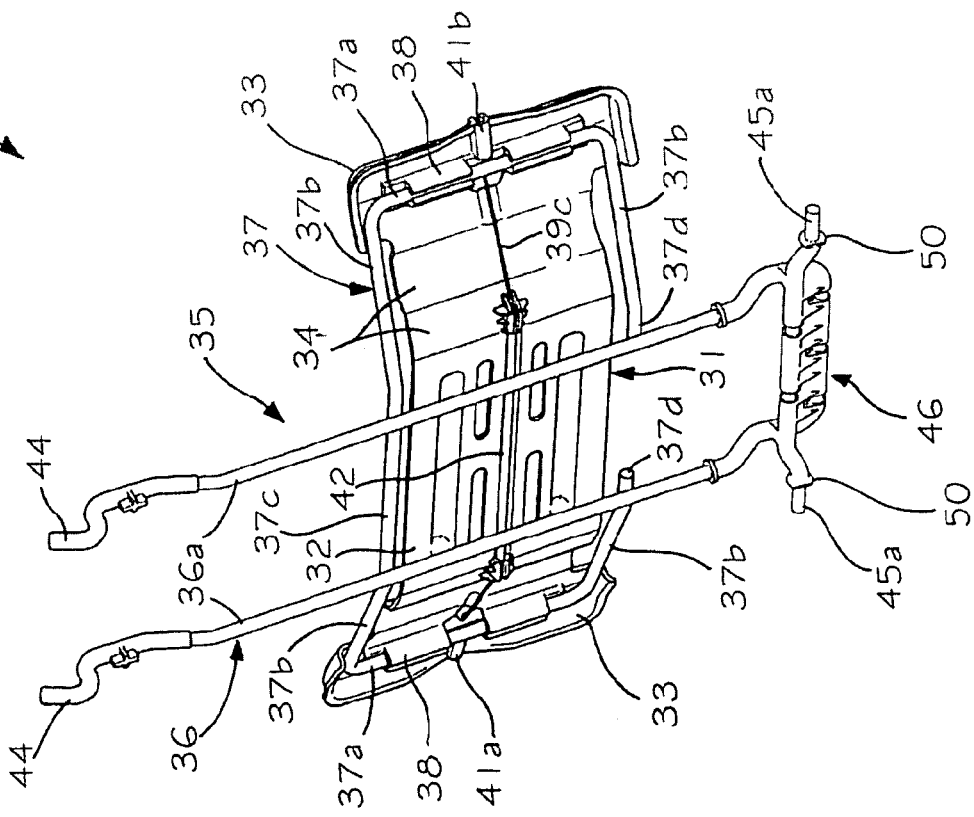

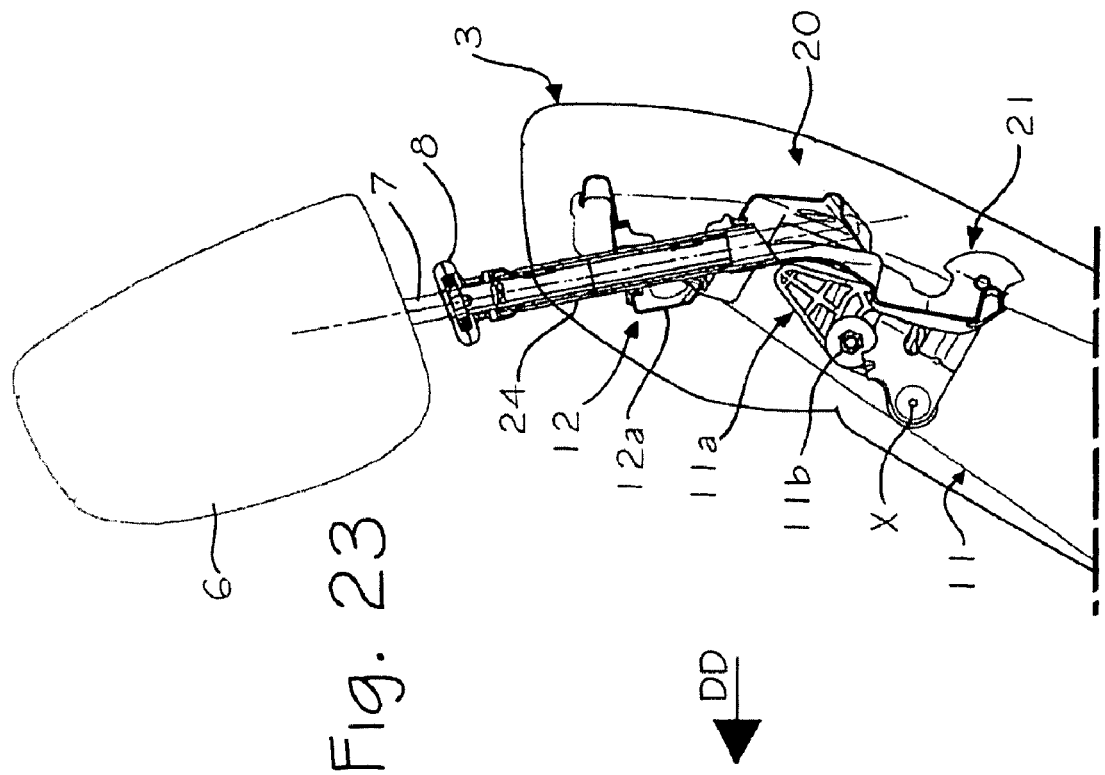
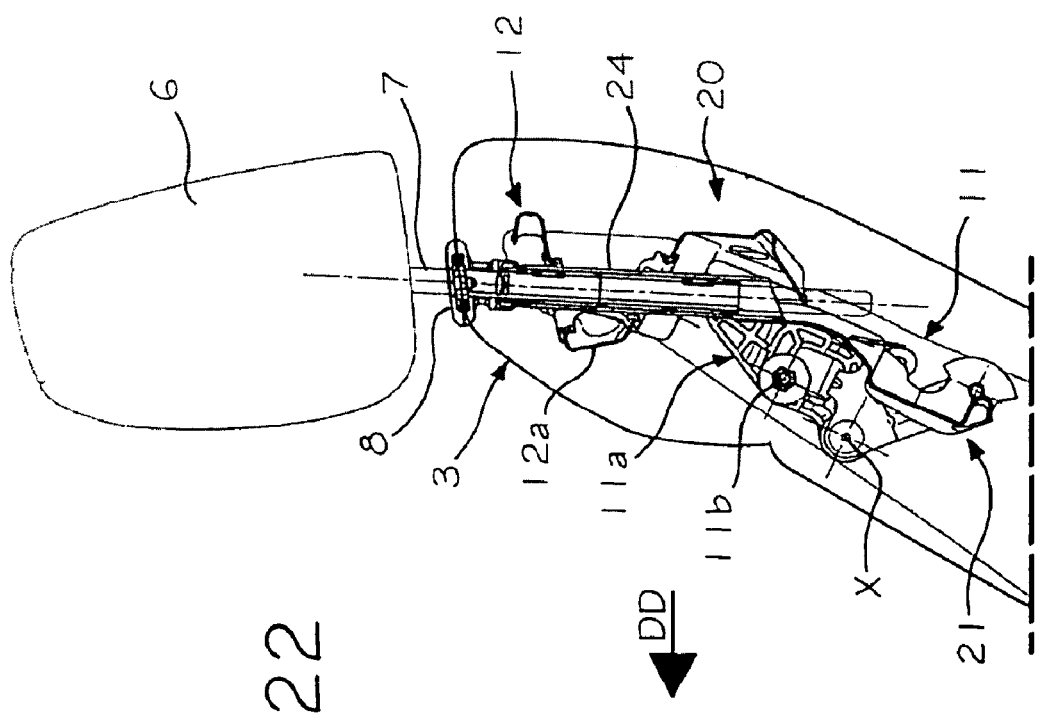

MOTOR VEHICLE SEAT

CROSS-REFERENCE TO RELATED APPLICATIONS

This application claims foreign priority benefits under 35 U.S.C. §119(a)-(d) to TO 2007A000747, filed Oct. 22, 2007, which is hereby incorporated by reference in its entirety.

BACKGROUND OF THE INVENTION

1. Field of the Invention

The present invention relates to a vehicle seat having an active headrest system and also relates to a lumbar support device.

2. Background Art

U.S. Pat. No. 7,044,544 discloses a vehicle seat back having a lumbar support element utilized as an activating element for an active headrest system. A lumbar support element of vertical operation is mounted on vertical rods having upper ends coupled to an impact body of the active headrest system. The lower ends of the rods are welded to a horizontal rod having opposite ends inserted into respective parallel guides that are secured to a lower cross beam of the frame of the seat back, with each of the guides defining an upwardly facing cam surface.

In event of a crash of the vehicle, the back of an occupant of the seat applies an impact force against the lumbar support element, which moves backward, and the aforesaid horizontal rod then slides on the cam surfaces. The lumbar support element and the vertical rods move back and are displaced upward as the rods transferring the relative movement to the impact body of the active headrest system. Thus, the lumbar support device contributes to the activation of the active headrest system, making the response to a crash situation more prompt.

The solution described in the cited prior document, while enabling a significant increase in the speed of intervention of the active headrest system, has some drawbacks. For example, the type of lumbar support used is not efficient from the standpoint of ergonomics and comfort, during normal use of the seat.

SUMMARY OF THE INVENTION

In its general terms, the present invention involves a vehicle seat having an active headrest system including a lumbar support device of an uncomplicated and economical design that provides heightened ergonomic and comfort characteristics. The seat has an active headrest system distinguished by a heightened effectiveness and efficiency of use, in terms of reliability, rapidity, and precision of intervention. A seat back frame of the vehicle seat provides enhanced characteristics of reliability, rapidity and precision of intervention for the active headrest system. The invention also provides a lumbar support device of particularly advantageous use, but not exclusively, in combination with an active headrest system.

The above features, which will appear more clearly below, are achieved according to the present invention by a vehicle seat, a seat back frame, an active headrest system, and a lumbar support device shown by the drawings and the following detailed description.

BRIEF DESCRIPTION OF THE DRAWINGS

FIGS. 7 and 8 are respectively front and rear perspective views of a lumbar support device according to another embodiment of the invention;

FIGS. 12 and 13 are respectively front and rear perspective views of a lumbar support device according to another embodiment of the invention;

FIGS. 14 and 15 are respectively front and rear perspective views of a lumbar support device according to a further embodiment of the invention;

FIGS. 16 and 17 are two horizontal sections of the lumbar support device in FIGS. 14 and 15, in two different states;

FIGS. 18 and 19 are two vertical sections of the device of FIGS. 14 and 15, in two states corresponding to those of FIGS. 16 and 17;

FIGS. 20 and 21 are front perspective views of two lumbar support devices according to additional embodiments of the invention;

FIGS. 22 and 23 are schematic representations in partial cross section of a seat back of a motor vehicle seat constructed according to the invention;

DETAILED DESCRIPTION OF THE PREFERRED EMBODIMENT(S)

Figure 1:
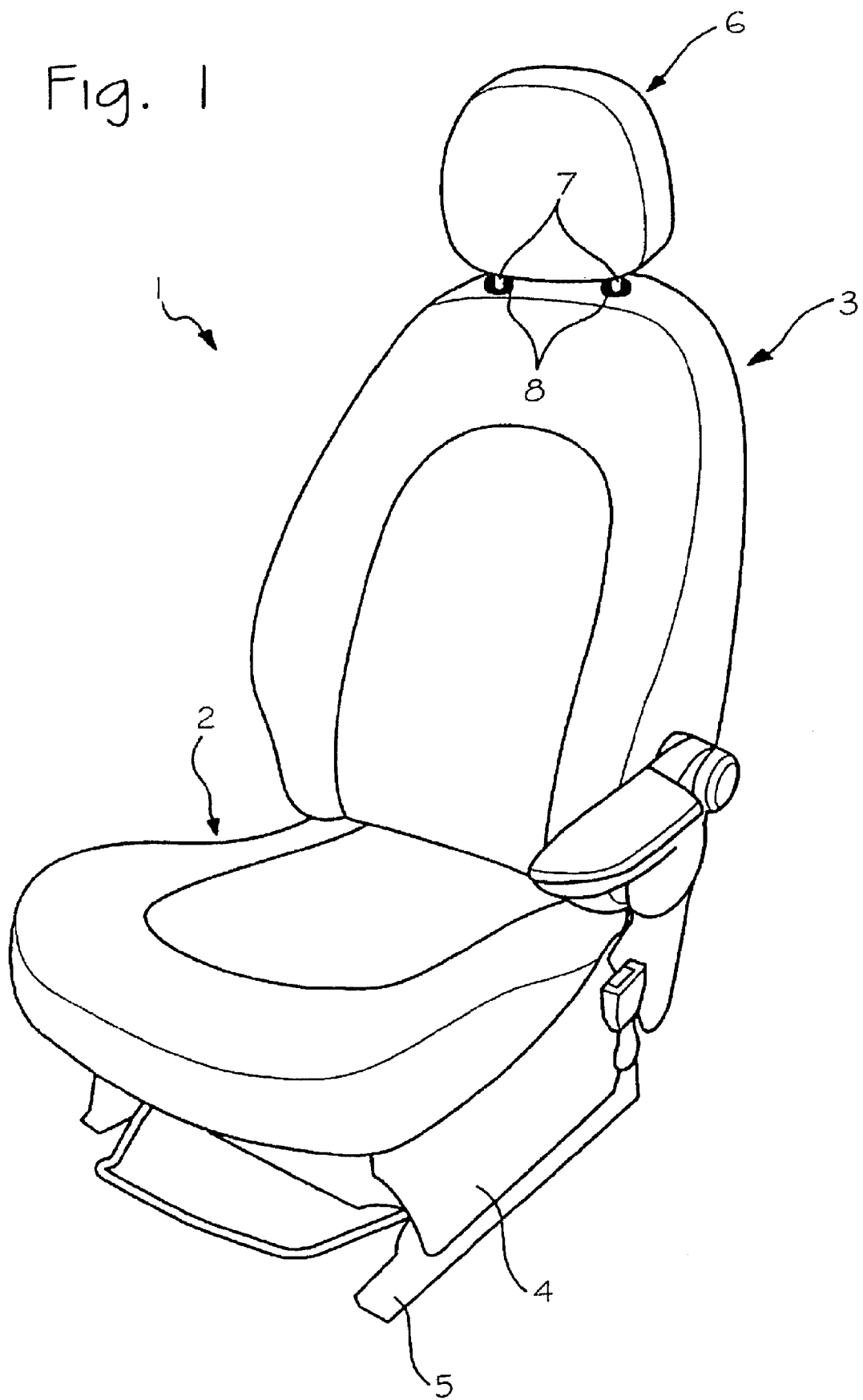
FIG. 1 is a perspective schematic view of a motor vehicle seat, constructed in accordance with one embodiment of the invention.

As shown in FIG. 1, a vehicle seat 1 constructed according to the present invention includes a seat cushion 2 and a seat back 3. The seat cushion 2 includes a metallic framework operatively coupled to lower slide rails 5 for securement to the floor of the passenger compartment of any type of vehicle, not shown. The lower extremity of the seat back 3 is hinged to the structure 4 of the seat cushion 2, so as to allow adjustment of its inclination. A headrest 6 is mounted on the seat back 3 by support rods 7 inserted in adjustable manner in plastic bushings 8 secured to the upper ends of respective tubular guide elements that are internal to the seat back and hereinafter described.

The seat back 3 disclosed includes a headrest system of active type, i.e., designed to move forwardly during an impact. In seats of this type, the internal frame of the seat back is linked in movable manner to a support mechanism of the headrest. This movable mechanism is basically located in the upper region of the seat back and includes an impact body or element that is moved by the back of the seat occupant during an impact to raise the movable mechanism from an inactive position to an active position and thereby move the headrest from a lower position to a forward and raised position, relative to the head of the seat occupant.

Figure 2:
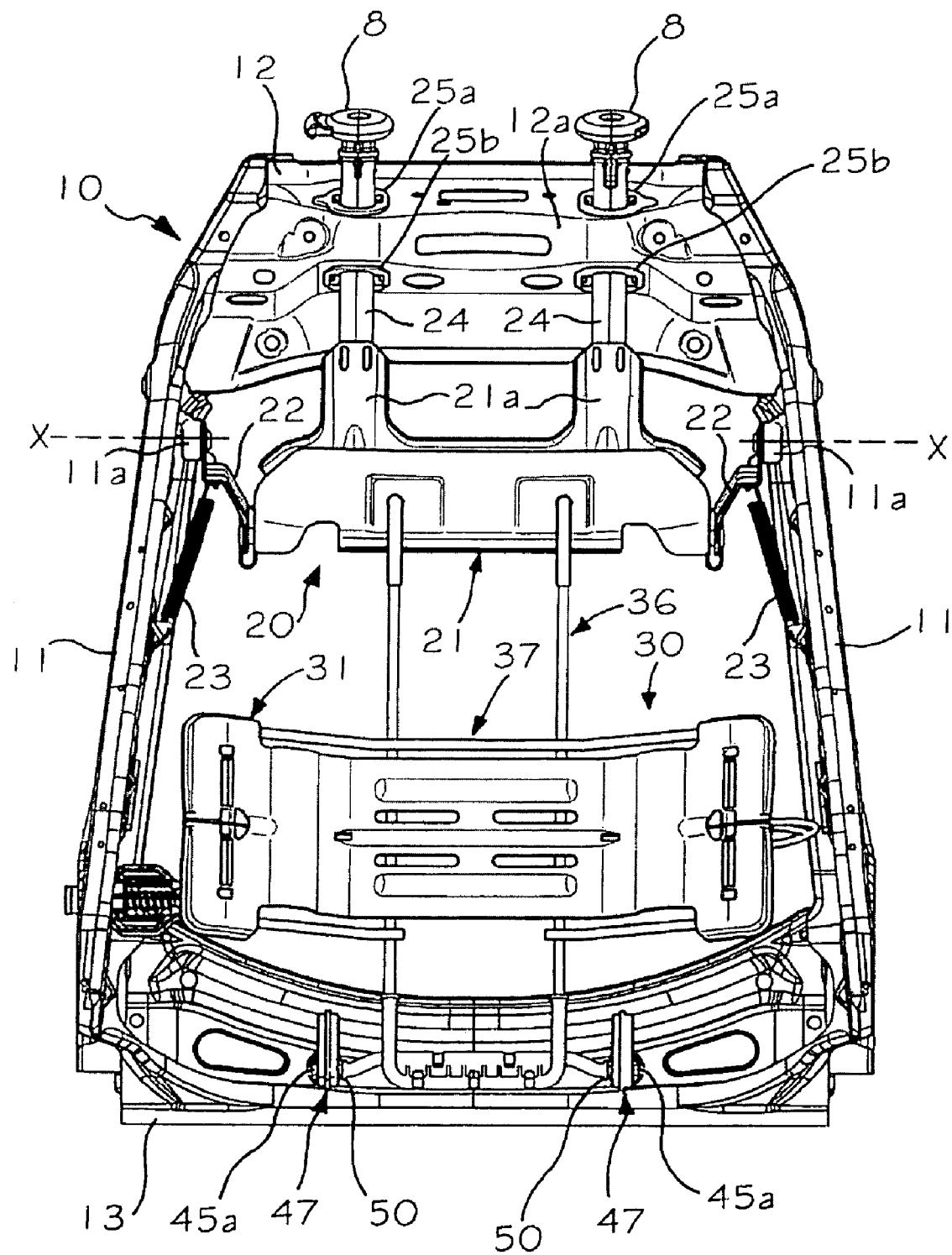
FIGS. 2, 3, and 4 are, respectively, a front elevation view, a front perspective view and a rear perspective view of the internal structure of the seat back of FIG. 1.
Figure 3:
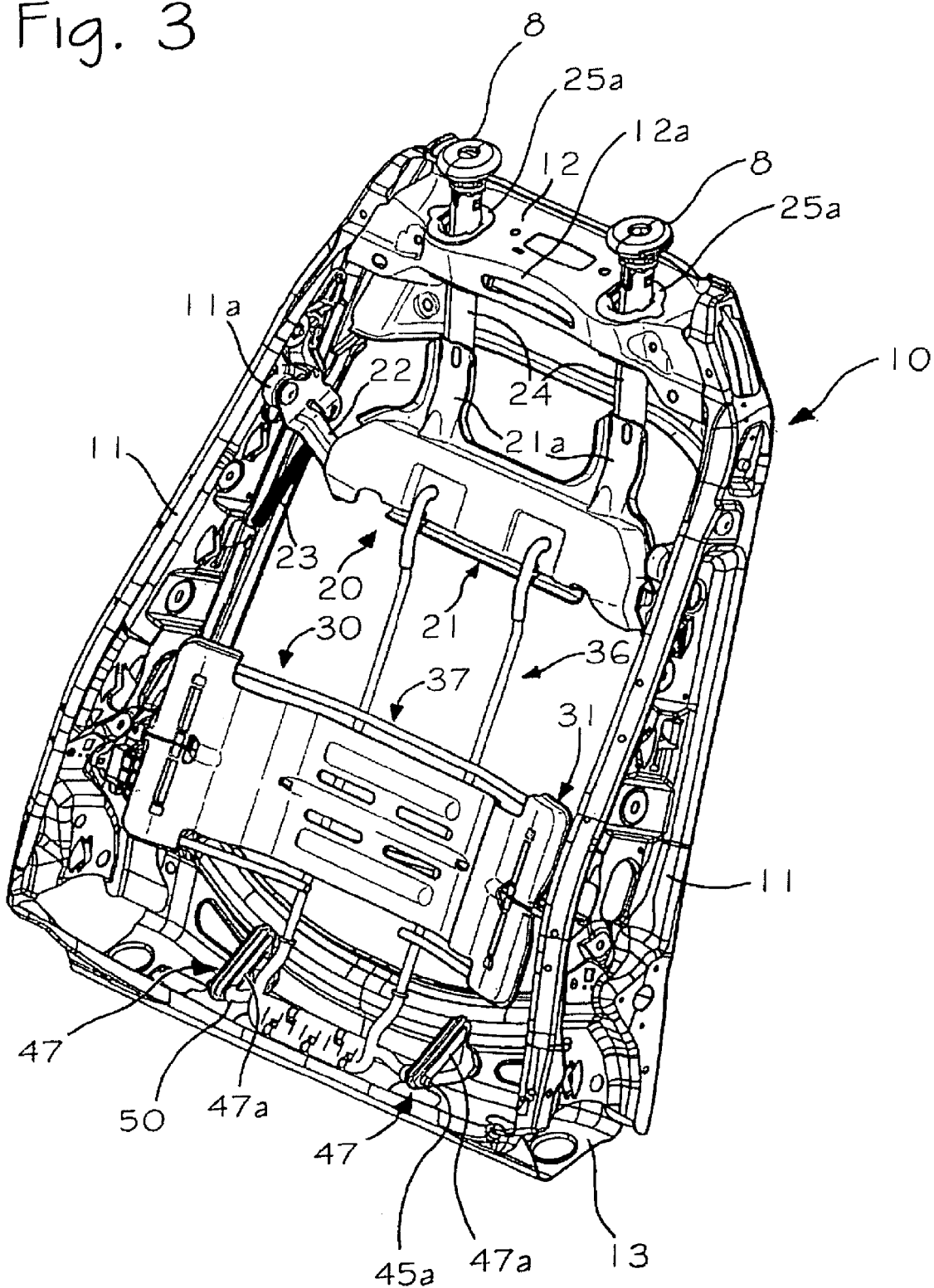
Figure 4:
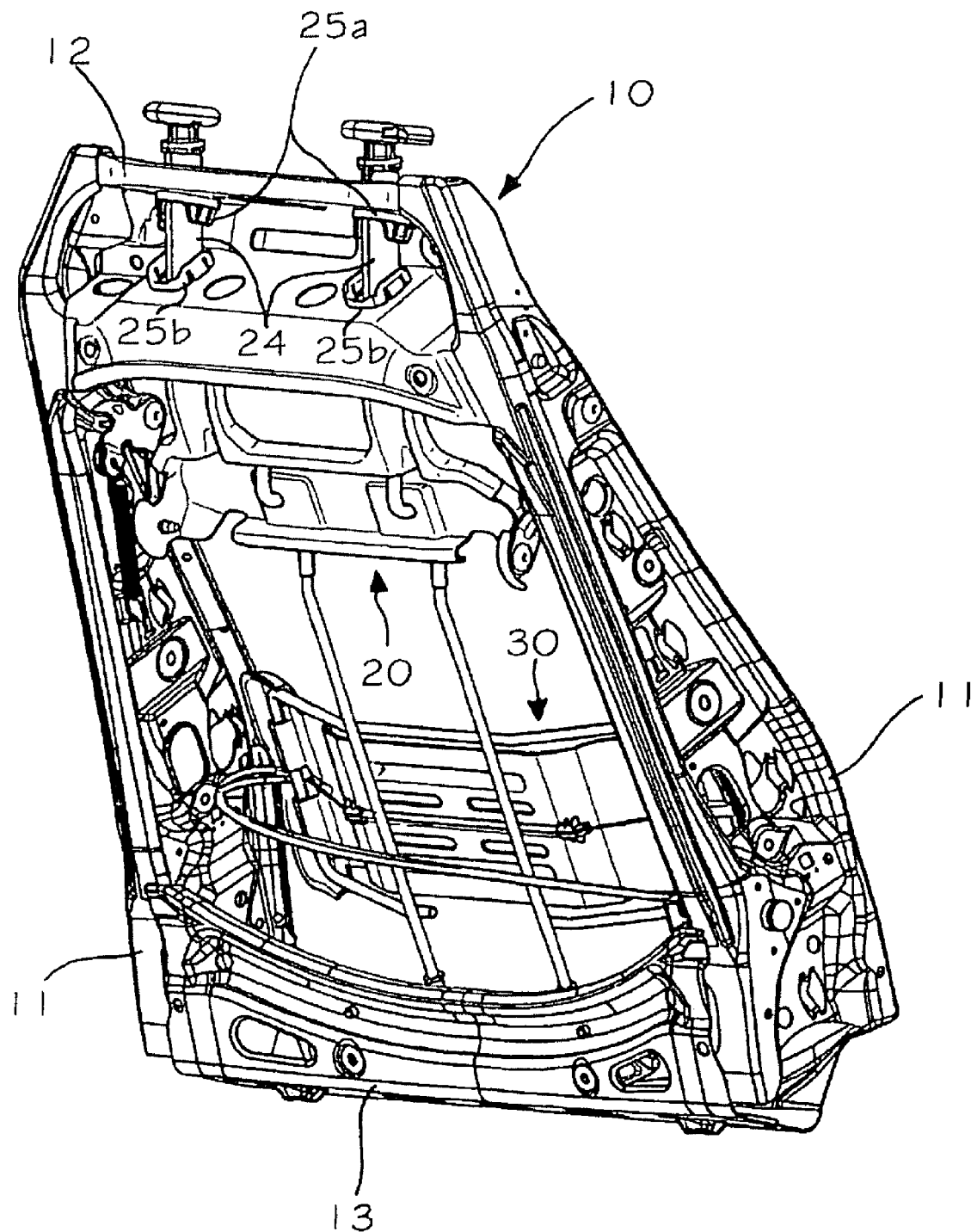
Figure 5:
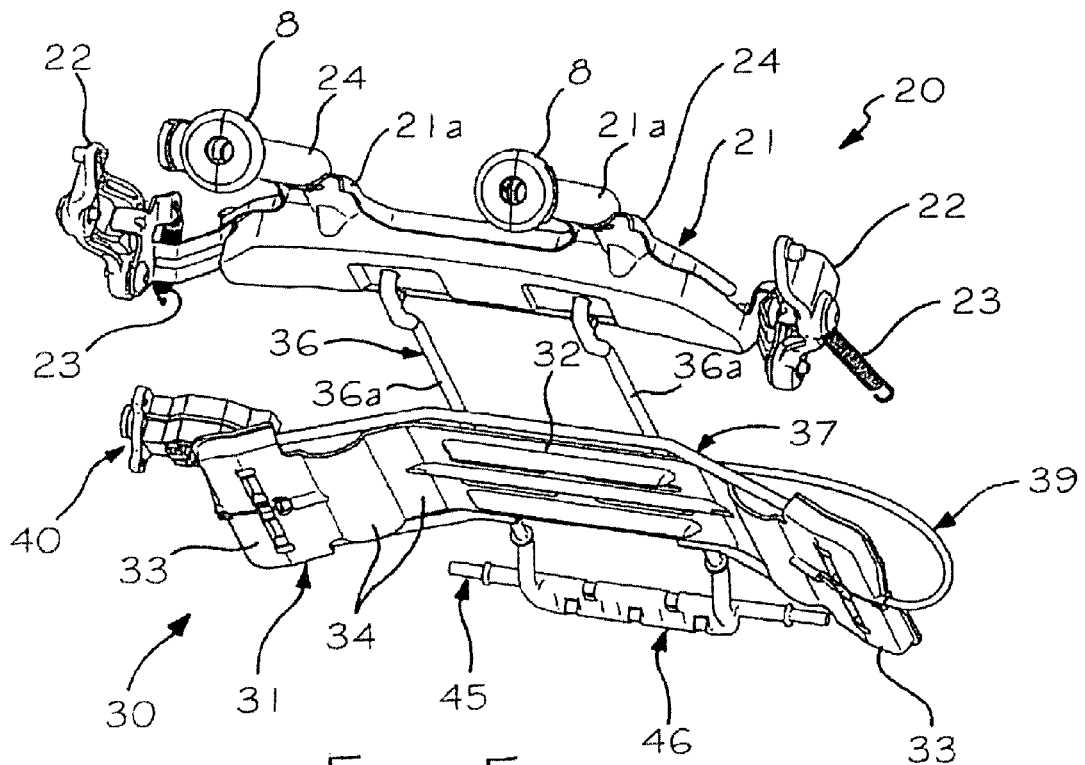
FIGS. 5 and 6 are two perspective views of a lumbar support device, in two different states, being part of an active headrest system of the seat back of FIGS. 2-4.
Figure 6:
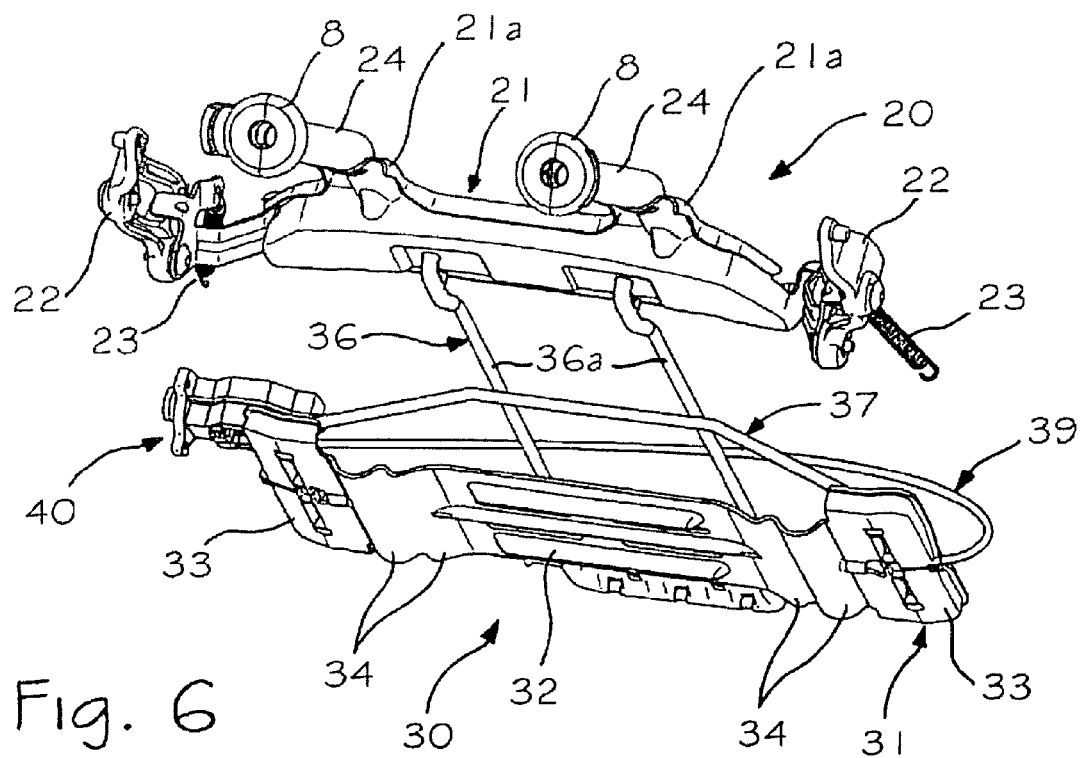

The interior of the seat back 3 includes an active headrest system and associated lumbar support device shown in FIGS. 2-4. FIGS. 5 and 6 illustrate further aspects of the seat.

As shown in FIGS. 2-4, the seat back frame 10 is shown as formed by sheet metal parts which are welded or otherwise joined together. The frame 10 includes two lateral uprights 11 joined together at the respective ends by an upper cross beam 12 and a lower cross beam 13. As shown in FIGS. 5 and 6, an overall upper mechanism 20 embodies an active headrest system and a lower mechanism 30 embodies a lumbar support device that cooperates with the active headrest system.

The upper mechanism 20 includes a metallic impact body 21, extending longitudinally in a direction transverse to the height direction of the frame 10. At each longitudinal end of the body 21 is secured the end of a respective hinge element 22, whose other end is hinged to a respective upright 11 of the frame 10, provided with a connection interface 11a for this purpose. The body 21 is therefore mounted movable with respect to the frame 10, so that it can rotate about the axis indicated by X in FIG. 2.

Two stress elements 23, shown in FIGS. 2, 5, and 6, each are operatively interposed between a hinge element 22 and the respective upright 11 of the frame 10. The elements 23 are designed to maintain the impact body 21, and therefore the upper mechanism 20 as a whole, in a respective inactive position. The elements 23 are configured, in particular, to oppose the backward rotation of the impact body 21 about the axis X, while allowing the rotation when the body 21 is subjected to a force greater than a particular threshold for actuation of the active headrest system. In the example shown, the elements 23 are comprised of helical springs, but it is clear that these could be replaced by any other technically equivalent element.

An upper zone of the impact body 21 has two vertical extensions 21a, each of which defines an axial concavity in which is rigidly fixed, for example by welding, a respective tubular guide element 24, of circular cross section and preferably shaped from metallic material. The tubular guide elements 24, which are parallel to each other, have upper ends that support bushings 8. The bushings 8 and the guide elements 24 are designed to receive the shafts 7 of the headrest 6 of FIG. 1. The upper cross beam 12 of the frame 10 is shaped so as to have a hollow frontal protuberance or projection 12a, through which pass the tubular guide elements 24. The hollow part 12a is provided for this purpose with passages having an oblong cross section, outfitted with upper and lower plastic bushings 25a and 25b that define respective axial passages of oblong cross section.

FIGS. 7 and 8 show the sole lower mechanism 30 of the active headrest system of FIGS. 5 and 6, i.e., a lumbar support device provided according to the present invention. The lumbar support device 30 includes a lumbar support element 31, which is longitudinally extended in a direction basically perpendicular to the height direction of the frame 10.

The lumbar support element 31 (hereinafter simply called "lumbar element") has an intermediate part 32 and two lateral parts 33, the intermediate part 32 having a longitudinal dimension larger than that of the lateral parts 33, these latter being essentially mirror images. As shall be shown hereafter, each lateral part 33 is designed to be hinged to a support structure of the lumbar element 31, so as to rotate about an essentially fixed axis. The hinging is preferably achieved by hinge elements borne by or integrated in the lateral parts 33 themselves.

Each lateral part 33 is connected to the intermediate part 32 by a flexible part 34 having longitudinal flexibility, i.e., its extent in the longitudinal direction can be changed in reversible manner in a side-to-side lateral direction with respect to the seat. The term "longitudinal" is meant here with reference to the principal direction of extension of the support element 31. The longitudinal flexibility is such as to allow a reversible shortening or lengthening of the longitudinal extent of the parts 34, depending on the operative position assigned to the lumber element 31 which, as stated is laterally with respect to the seat. As shall be made clear below, furthermore, the reversible deformation allowed for the flexible parts 34 also includes their reversible curvature.

In the embodiment illustrated, the flexible parts 34 have undulating shapes whose cross sections each have a decreasing width, starting from the respective lateral part 31 and moving toward the central part 32 of the lumbar element 31. Such a conformation is preferred in order to favor the longitudinal flexibility of the parts 34, with respect to their possibility of curvature. However, it is clear that the flexible parts 34 can also have a configuration different from that illustrated. In general, the cross section of the parts 34 can have a regular or irregular alternation of peaks and valleys, so as to have a cross section with periodic form (for example, the form of a sine wave, a square wave, or a triangular wave), or not.

As shown in FIGS. 7 and 8, the support structure of the lumbar element 31 is generally indicated at 35 and preferably formed by a plurality of relatively rigid metal rods or shafts. As is particularly evident in FIG. 8, the structure 35 includes two pieces of rod 36a, which extend for the most part in the height direction of the frame 10 (see, for example, FIGS. 2-4). In the example shown, the pieces of rod 36a are obtained from the same rod 36, bent essentially in a U, but each piece 36a can also be obtained via a respective rod (see, for example, the embodiment in FIG. 12). To the pieces of rod 36a, in a relative intermediate zone, here being rectilinear, is rigidly fixed, preferably by spot welding, a support rod 37, which has a plurality of bends, so as to define a plurality of rod pieces, among which at least two rod pieces 37a are essentially parallel to each other and to the rod pieces 36a, the distance between centers of the former being greater than that for the latter.

The rod 37 is bent such that the rod pieces 37a in relation to the height direction of the seat back frame are in an advanced position as compared to the rod pieces 36a. For this purpose, in the example, rod 37 has two pairs of parallel rod pieces 37b inclined to the front. Between the upper pieces 37b there extends a rod piece 37c transverse to the pieces 36a and welded to them. On the other hand, from the lower pieces 37b there extend respective rod pieces 37d, which are parallel to the piece 37c and likewise spot welded to the pieces 36a. As an illustration, the rods 36 and 37 are obtained from metal rods having a diameter of around 6 mm. Of course, the rod pieces 37a could also be obtained from distinct rods.

Each lateral part 33 of the lumbar element 31 is hinged to the support structure 35, particularly so that it can rotate about an essentially fixed axis. In the example, each part 33 is hinged to a respective rod piece 37a and has, for this purpose, a respective hinge element 38. In the example depicted, each lateral part 33 comprises two hinge elements 38, axially aligned. Each hinge element 38 is basically made up of a hook element, able to engage in rotating fashion with a rod piece 37a. For this, each element 38 preferably has two opposing hook surfaces, between which the piece 37a can be accommodated.

In the preferred embodiment of the invention, the lumbar element 31 is made from a single piece, i.e., the central part 32, the lateral parts 33 and the flexible parts 34 are shaped entirely from a single piece of material. Advantageously, the hinge elements 38 are shaped together with the respective lateral part 33. Preferably, the material used is a synthetic based material, such as a thermoplastic material, so as to possess elastic rebound characteristics allowing for a reversible deformation of the flexible parts 34.

Also, in the sample embodiment shown, the cross section of the body of the lumbar element 31 has a predominantly constant thickness, obviously except for the zones used to produce the hinge elements 38 and other functional elements described hereafter.

The lumbar support device 30 furthermore contains means of interconnection of the two lateral parts 33, so as to hold the lumbar element 31 in a respective operating position. In the example considered here, the lumbar element 31 is arranged so that its operating position can be modified by the user of the seat among a plurality of possible adjustment positions. In this embodiment, the means of interconnection include a flexible element, particularly a cable, essentially of the Bowden type, indicated as a whole by 39. The cable 39 contains an external sheath 39a having one end connected to one of the lateral parts 33, the other end of the sheath 39a being connected to the body of an actuator, indicated as a whole by 40 in FIGS. 7 and 8. The Bowden cable 39 furthermore contains a flexible wire 39b, having one end connected to the lateral part 33 opposite the one to which the sheath 39a is connected, the other end of the wire 39b being connected to a traction element of the actuator 40, in familiar manner. The actuator 40 can be of the manual activation type or the motorized operation type.

The lateral parts 33 are designed to have respective seats for engaging the end of the sheath 39a and the wire 39b. In particular, again in FIGS. 7 and 8, item 41 indicates the seat to receive the end of the sheath 39a, while 41b indicates the seat to receive the end of the wire 39b (obviously, this end of the wire has a corresponding big-end element, of familiar type, designed to prevent the wire from slipping out of the corresponding seat). It will be noted that the seats 41a and 41b can be identical to each other, which favors the flexibility of installation of the Bowden cable 39 and the corresponding actuator 40 on the seat.

Also in FIG. 8 one can see how, at the rear part of the lumbar element 31, a segment of the wire 39b intermediate to the lateral parts 33 passes through a piece of sheath 42, having the respective ends connected to the lumbar support element 31, basically at the transition region between each flexible part 34 and the central part 32. For this, seats 43 are provided to accommodate the ends of the piece of sheath 42, the seats also being advantageously produced as part of the lumbar support element 31. In use, the segment of wire 39b extending between the lateral parts 33 rests against the rear surface of the lumbar element 31 (with the piece of sheath 42 being interposed, in its intermediate part), helping to assure the maintaining of the position assigned to the element itself.

In the example depicted, as mentioned, the operating position of the support element 31 can be adjusted by a user among a plurality of possible adjustment positions, by controlling the actuator 40. By activating the actuator device 40, the Bowden cable system 39 can be operated to stress the lateral parts 33, essentially one against the other, so as to cause their angular movement about the respective axes of rotation, as represented by the rod pieces 37a.

Figure 9:
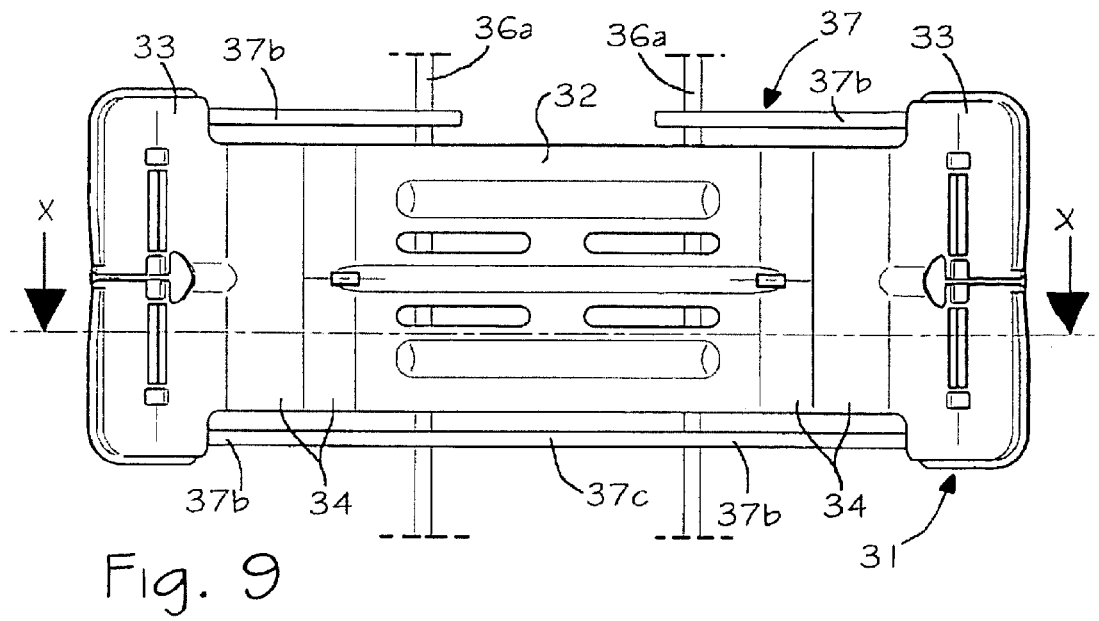
FIG. 9 is a front elevation view of a portion of a lumbar support device according to another embodiment of the invention.
Figure 10:
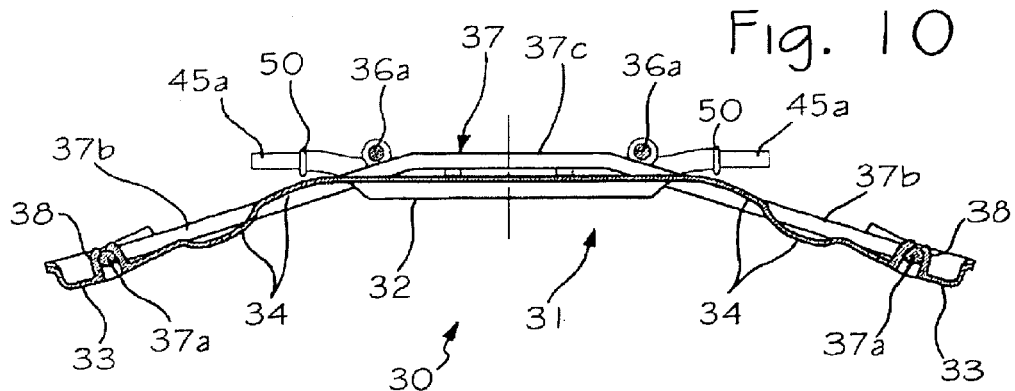
FIGS. 10 and 11 are two horizontal sections of the device in FIG. 9, taken along line X-X, in two states corresponding to those of the embodiment of FIGS. 5 and 6.
Figure 11:
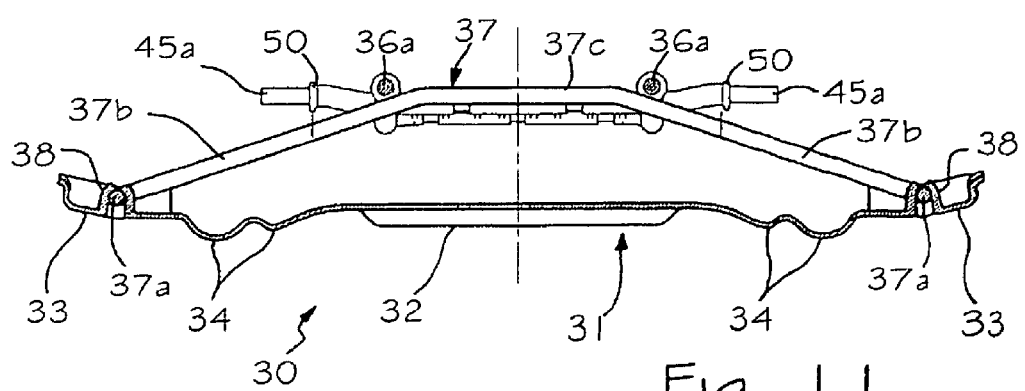

This rotational movement of the lateral parts 33 dictates a consequent reversible deformation of the length of the flexible parts 34. The functional principle of the lumbar support device 30 can be seen with respect to the possible operating positions that can be assigned to the lumbar support element 31 from FIGS. 5-6 and 10-11, where the device itself is represented in two extreme operating positions. The cross sections of FIGS. 10 and 11 refer to one variant of the device 30 illustrated in FIG. 9, which differs from that of FIGS. 7 and 8 merely by a different orientation and fixation of the rod 37 (which is reversed from the preceding case and secured to the pieces 36a by means of the pieces 37b): the functional principle of the devices in FIGS. 7-8 and FIG. 9 is the same, however.

The extreme positions correspond respectively to a position of maximum retraction (FIGS. 5 and 10) and maximum advancement (FIGS. 6 and 11) of the intermediate part 32 of the lumbar support 31 relative to the back of the seat occupant. At least in the operating position of maximum retraction, and in the majority of the intermediate positions between the latter and the position of maximum advancement, the intermediate part 32 is in a backed-off position relative to the hinge points of the lateral parts 33 (for example, as is quite apparent in FIGS. 6 and 10). The intermediate part 32, here basically shaped as a predominantly flat plate, lies essentially always in a respective plane. As can be noted in FIG. 10, in the position of maximum retraction, the general plane of the intermediate part 32 is in a position behind and at a distance from a plane described by the axes of rotation of the lateral parts 33 (or the rod pieces 37a), the two planes being essentially parallel. In the position of maximum advancement, which can be seen in FIG. 11, the planes are instead very close to each other: in the example illustrated, the general plane of part 32 is slightly in front of the plane described by the hinge axes of the parts 33, but in other embodiments the reverse might be true, or the two planes could essentially coincide with each other.

Starting from the position of maximum retraction, activation of the actuator 40 has the effect of pulling the two lateral parts 33, via the Bowden cable 39, essentially toward each other, thus causing them to rotate about the respective rod pieces 37a. This rotation has the effect of dictating the longitudinal flexibility of the flexible parts 34, whose longitudinal dimension becomes shorter. This shortening is made possible by the fact that the lateral parts 33 and the intermediate part 32 of the lumbar support 31, having essentially a straight cross section, have essentially no longitudinal flexibility or, in any case, they have a longitudinal flexibility which is much less than that permitted for the flexible parts 34. Consequently, in the course of the rotation of the lateral parts 33, the intermediate part 32 is brought forward, also thanks to a possibility of reversible curvature of the flexible parts 34. The parts 32 and 33 essentially lacking any longitudinal flexibility and, due to the fact that the advancement of the intermediate part 32 has the effect of bringing the ends of the part 32 itself closer to the axes of rotation in fixed position (the rod pieces 37a), the flexible parts 34 must necessarily be deformed in the direction of reducing their dimension in the longitudinal direction of the lumbar element 31. As is evident from comparing FIGS. 5, 10 and 6, 11, in the position of maximum retraction the undulations of the flexible parts 34 have a certain amplitude, which can be reduced progressively as a function of the regulation provided, until reaching the position of maximum advancement. Obviously, the regulating from the position of maximum advancement to that of minimum advancement occurs by similar methods, slackening the Bowden cable, and thanks to the elastic recoil characteristics of the lumbar element 31, with increasing amplitude of the undulations of the flexible parts 34.

FIGS. 5-6 and 10-11 show how the intermediate part 32 has basically the same essentially planar configuration in any operating position to adjust the lumber element 31. As a result of this characteristic, the comfort and ergonomics in the use of the lumbar support device are enhanced.

As noted, FIGS. 5-6 and 10-11 represent the two operating limit positions for the lumbar element 31, but it is clear that, due to the functional principle of the flexible parts 34, even in operating positions which are intermediate to these extreme ones, the intermediate part 32 will not change its shape, which in the example is essentially rectilinear and lying in the respective general plane.

The support structure 35 of the lumbar element 31 as shown in FIGS. 7 and 8 is operatively connected to the active headrest system of the seat back 3, and particularly to its upper movable mechanism, indicated by 20 in FIGS. 2-6. The connection is such that, due to an impact force applied to the lumbar element 31, at least part of the respective support structure 35 is displaced, triggering the movement of the upper mechanism 20. For this, the rod pieces 36a function essentially as means of transfer and are arranged to be connected, in the respective upper region, to the impact element 21 of the mechanism 20. As can be seen, e.g., in FIGS. 2-4, the upper region of the rod pieces 36a is inserted into holes made in the body 21. The upper ends of the pieces 36a are not rigidly attached to the impact element 21, but simply inserted into the respective holes, with a minimal possibility of movement between the parts. For this reason, according to a particularly advantageous characteristic of the invention, on the metal body of the rod 36, at its two end regions, there is locally applied, preferably by molding on, a body 44 of plastic or rubber material, as shown in FIGS. 7 and 8. These bodies 44 have the function of helping to transmit, via the rods 36a, the impulse to the upper mechanism 20, avoiding noise effects produced by metal on metal contact. Moreover, as can be appreciated, the end regions of the rod 36, or rather those of its pieces 36a, has a double bend, so as to realize a precise and reliable coupling with the impact body 21 (see, for example, FIGS. 3 and 4).

The support structure 35 of the lumbar element 31 is moreover designed to be coupled in guided manner, in the respective lower region, relative to the seat back frame 10, via guiding means. As is seen in FIGS. 7 and 8, the aforesaid guide means comprise a pair of guided elements 45a composed essentially of two pins axially aligned with each other and spaced apart. In the embodiment illustrated, the guided elements 45a are obtained from the same metal rod, designated overall as 45, appropriately bent in its intermediate part and integrated with the lower part of the rod 36. In the embodiment of FIGS. 7 and 8, the coupling between the rod 36 and the rod 45 is achieved by partly molding a body of synthetic material, especially thermoplastic material, onto these rods, as designated by 46.

The guide means then comprise a pair of guides, parallel to each other, in fixed position relative to the frame 10, preferably welded to the respective lower cross beam 13. The guides, indicated by 47 in FIGS. 2 and 3, each define an essentially closed path, which includes a cam surface, designated as 47a in FIG. 3. In the sample embodiment, the cam surface extends generally upward, with respect to the frame 10. The opposed guided elements 45a are each inserted into a respective guide 47, so as to bear against the respective cam surface 47a.

With such an arrangement, the support structure 35 of the lumbar element 31 is supported overall at the bottom on the cam surfaces 47a. In use, when an impact force is applied to the lumbar support device 30, the device itself is guided in articulated fashion by means of the guides 47, to move in a predefined direction, particularly in a generally upward direction, thereby causing, via the transfer rod pieces 36a, also a displacement of the impact body 21 of the upper mechanism 20 of the active headrest system, triggering the activation of same.

According to one characteristic which is itself inventive, the molded body 46 is shaped to define at least one positioning locator for the respective guided element 45a relative to its guide 47. In the sample embodiment, the locators for the two guided elements 45a are indicated as 50 and have the shape, basically, of circular flange abutments, although various alternative shapes are possible. As can be appreciated, for example, from FIGS. 2 and 3, when the guided elements 45a are inserted into the respective guides 47, the locators 50 guarantee the maintaining of a correct mutual position between the parts. This is particularly advantageous in the case of the use of the lumbar support device 30 for purposes of activation of the active headrest system. In such a case, the force of impact applied to the lumbar element 31 pushes the latter and the corresponding support structure 35 backward, with the guided elements 45a sliding on the cam surfaces 47a. In this phase, the locator means 50 guarantee the maintaining of a correct position of the elements 45a in the course of their displacement, and thus the maintaining of the correct general axis of displacement of the overall device 30. In this way, one therefore avoids lateral "listing" of the device.

It will be noted that the guide means could contain a single guided element and a single guide, in a position intermediate to that of the means shown in the figure, and with any suitable shape for this purpose.

The functioning of the active headrest system with integrated lumbar support device according to the present invention is, in many respects similar to that described in U.S. Pat. No. 7,044,544, the entire disclosure of which is hereby incorporated here by reference. Generally speaking, in event of an impact, the pelvic/lumbar region of the back of the seat occupant generates a force of impact on the lumbar support device 30 which, due to the presence of the lower guide means 45a, 47, tends to move backward and upward. The transfer rods 36a transfer this movement to the impact body 21, belonging to the upper mechanism 20, producing a relative rotation about the axis X and, thus, a forward and upward movement of the headrest 6. Thereafter, the upper part of the occupant's back can also exert a relative force of impact on the impact body 21, which rotates further and completes the actuation of the system.

Of course, by "impact force" is meant a load applied to the mechanisms 20 and/or 30 such as overcomes the opposing action of the stress elements 23, and thus causing a rotation of the body 21 about the axis X. In conditions of normal use of the seat, therefore, the fact that the user's back rests against the seat back is not in itself sufficient to cause the described activation of the system, nor is a substantial deformation of the lumbar element 31 or a changing of the operating position assigned to this.

The active headrest system thus designed responds in swift manner to the forces applied to the seat back by the occupant in event of an accident, and these forces will be transferred more efficiently by the seat occupant to the active headrest system. Moreover, thanks to the conformation of the lumbar element, the seat better supports the occupant during a crash and limits its dangers. As regards the solution described in U.S. Pat. No. 7,044,544, the lumbar support device 30 designed according to the present invention significantly increases the ergonomics and the comfort of the system. The lumbar element 31 provides a band transverse to the seat back, or essentially horizontal, which has a more adaptive function than that of the lumbar element of the cited prior document, and better adapts to the back of the occupant, thus also contributing to the speed of intervention of the active headrest system.

The lumbar support device 30 is of extremely simple and economical construction. It will be noticed that the basic components of the device are very limited in number and of very simple industrial production. In particular, for example, making reference to FIGS. 7 and 8, the device basically comprises the following components:

the lumbar element 31 which, as stated, can be produced as a single body by a simple operation of molding of synthetic material, particularly thermoplastic material;

the metal rod 36 have a general U shape, whose vertical segments embody the rod pieces 36a;

the other metal rod 37, bent essentially in quadrangular shape, defining the rod pieces 37a which embody the axes of rotation of the lateral parts 33 of the lumbar element 31;

a rod 45 embodying both of the guided elements 45a;

an actuation mechanism, comprising off the shelf components, i.e., the actuator 40, the Bowden cable 39 (with respective sheath 39a and wire 39b), the piece of sheath 42.

As stated, the rods 36, 37 can conveniently be integrated as one by simple operations of spot welding. The assembly thus produced is then combined with the rod 45. This operation as well can involve a spot welding. More conveniently, this attachment is achieved by molding onto it a union body of plastic material, advantageously also integrating the locator stops 50 for the support structure of the lumbar element. On the upper ends of the transfer rods 36 are molded on the respective plastic bodies 44. Obviously, this type of design should be taken as a mere illustration, especially in terms of number and conformation of the rods making up the support structure 35.

In this regard, e.g., in FIGS. 12 and 13, there is illustrated a variant for the actuation of a lumbar support device 30. The device shown has a general structure and functional principle analogous to what has already been described, but in this case the respective support structure 35 is realized by rods having a different conformation compared to that in the previous example. In this embodiment, the rod pieces 36a belong to distinct rods 36, the lower ends of which are joined, especially by spot welding, to a rod 45 having a conformation different from that already illustrated, but defining the guided elements 45a. In this embodiment, two bodies 46 of plastic material are locally molded onto the rod 45, embodying the locator stops 50.

The support rod 37 of FIG. 13 is also of different general conformation from the homologous rod of the preceding embodiments, and has a transverse central piece 37c, two vertical pieces bearing against the pieces 36a (one indicated as 37e), by spot welding, two transverse pieces with slight forward inclination 37b (FIG. 12) and, finally, the rod pieces 37a which embody the hinge pins of the lateral parts 33 of the lumbar element 31.

In FIGS. 14 and 15 a further possible embodiment of the lumbar support device 30 according to the present invention is shown. The intermediate part 32 of the lumbar element 31 has an upper extension and a lower extension, indicated respectively as 32a and 32b. The support 31 has a general configuration of basically a cross, where the extensions 32a and 32b are essentially orthogonal to the principal longitudinal direction of the element 31, given by the parts 32, 33 and 34. In the preferred embodiment, the extensions 32a and 32b are connected to the intermediate part 32 by respective flexible parts 34a, configured basically as a bellows, and therefore also having longitudinal flexibility, i.e., being able to undergo a reversible change in the respective dimension (shortening or lengthening), as well as being capable of reversible curvature.

As is seen, especially in FIG. 15, the extensions 32a and 32b are also designed to be hinged so as to rotate about axes in essentially fixed position, especially relative to the support structure 35 of the device 30. For this, in particular, the extensions integrate respective hinge elements 38a, of realization similar to those previously indicated by 38. These hinge elements 38a cooperate with horizontal rod pieces 37c, transverse to the rod pieces 36a, belonging to the same support rod 37. This latter is bent so as to have a basically cross shaped profile, so as to define both the aforesaid horizontal pieces 37c and the vertical pieces 37a for the hinging of the lateral parts 33 of the support 31. The upper extension 32a also integrates in its body a seat to accommodate the two ends of the rod 37, visible in FIG. 15.

It will be noticed that, in this embodiment, the extensions 32a, 32b can turn relative to respective axes of rotation, basically parallel to each other and perpendicular to the axes of rotation of the lateral parts 33. The axes of rotation dictated by the pieces 37a are in a forward position relative to the axes of rotation dictated by the pieces 37c, given the presence of rod pieces 37b inclined forward. In this embodiment, the change in the position of adjustment for the central part 32 of the element 31, achieved by methods similar to those previously described, dictates a reversible deformation as well for the flexible parts 34a, which therefore tend to change their length and curvature, as can be seen in FIGS. 16-17 and 18-19, which are mutually orthogonal cross sections of the device 30. In the operating position of maximum retraction of the device 30 (FIGS. 16 and 18), the vertical band formed by the parts 32, 32a, 32b and 34a lies essentially in the same general plane, parallel to the extension of the rod pieces 36a. As the central part 32 is gradually moved to the operating position of maximum advancement (FIGS. 17 and 19), the flexible parts 34a increase their extension, also with a relative bending. This bending primarily involves the extensions 32a, 32b, of course, since as already stated in whatever position of adjustment the configuration of the intermediate part 32 is essentially always the same. As noted, the points of rotation of the extensions 32a, 32b lie in a rearward position relative to the points of rotation of the lateral parts 33 of the lumbar element 31 which, as previously mentioned, are in a forward position relative to the central part 32 of the same element in the majority of the possible positions of adjustment.

In the case of FIGS. 14-19, the support rod 37 is joined to the rod 36 by staples, preferably metal ones, some of which are indicated by 51 in FIGS. 14-15, a solution which could also be used for the other embodiments. Obviously, in this embodiment as well, the lumber support 31 can be produced as a single piece of synthetic or plastic material, advantageously integrating the various functional complements (hinge elements 38, 38a, engaging seats 41a, 42b, engaging seats 43, etc.).

In the lumbar support device 30 of FIGS. 14-19, the particular shape of the lumbar element 31, essentially a cross, allows for further improvement in the ergonomic and functional performance of the system.

In the embodiments previously exemplified, the lumbar support device 30 is configured such that the operating position of the lumbar element 31 can be modified by a user among a plurality of possible adjustment positions. However, the invention is also applicable in the case when the lumbar support element 31 is intended to be installed in a predefined operating position, among a plurality of possible fixed and alternative installation positions, as exemplified in FIG. 20.

In this respect, one should stipulate that, in such types of seats, the lumbar support device is of fixed type, i.e., not adjustable, and it has a predetermined operating configuration, chosen by the producer of the seat or the vehicle. The lumbar support device provided according to the invention is advantageously applicable as well in such cases where the choice of the operating configuration can be easily done by providing the device itself with means of interconnection of the two lateral parts 33 of the desired length.

As is seen, in the previously described embodiment, the means of connection are of flexible type and constitute a Bowden type cable. For a "fixed" application, the Bowden cable can be replaced by a simple flexible element or even by a relatively rigid element. In the case of the example of FIG. 20, this element is represented by a flexible wire, indicated by 39c, whose two ends are each connected to a respective lateral part 33 of the lumbar support element 31. As is evident from the figure, the general embodiment shown for the device is practically analogous to that of the device in FIGS. 7 and 8, except for the presence of the Bowden cable 39 and the respective actuator 40. The flexible wire 39c has its two ends anchored at the seats 41a and 41b, and in this solution as well the piece of sheath 42 is also provided.

FIG. 20 illustrates one installed operating position corresponding to the maximum possible retraction for the intermediate part 32 of the lumbar element 31. Yet it is easily comprehended that, by changing the length of the wire 39c during the installation of the device 30, it is possible to obtain several fixed and alternative positions, one of which will be chosen according to the customer's requirements.

It is obvious that the suggested "fixed" configuration for the lumbar support device provided by the invention is also applicable to the forms of actuation of FIGS. 12-13 and 14-19. With particular regard to this latter case, FIG. 21 illustrates just such a device having a lumbar element 31 configured basically in a cross, in a fixed installation configuration. It is clear that even in this application the length chosen for the wire 39c determines both the position of the central part 32 and the camber of the extensions 32a and 32b. It is likewise obvious that, also in the case of a device with fixed installation, the intermediate part 32 of the lumbar element 31 basically keeps the same configuration in any operating position of installation of the lumbar support element 31. As already mentioned, in place of the wire 39c, the lateral parts 33 of the examples of FIGS. 20 and 21, one could use a relatively rigid element, such as a metal rod.

FIGS. 22 and 23 show part of the seat back 3 of a seat realized in accordance with a preferred embodiment of the invention, only the upper mechanism 20 of the active headrest system being shown. FIG. 22 refers to the inactive condition of the system, in which the headrest 6 is in a backed off position, while FIG. 23 refers to the condition of activation of the system. By comparing these two figures, it is possible to note how, due to the intervention of the system, the headrest 6 is brought into a forward and raised position as compared to the inactive position, with a pronounced displacement in this direction of the tubular elements 24 and, consequently, of the shafts 7 of the headrest 6. It will be noted that this displacement of the elements 24 is made possible both by the fact that the padding and the upholstery of the seat back 3 are relatively pliant and by the fact that the padding is provided for this purpose with passages for the elements 24, the passages of the padding having an oblong cross section in the direction of travel of the vehicle, as indicated by the arrow DD.

FIGS. 22 and 23 show how each upright 11 of the frame 10 (only one is visible, the other being of similar structure) has a connection interface 11a for the hinge elements 22 (FIGS. 2, 3, 5, and 6). In the sample embodiment, the interfaces 11a are configured as profiled elements, preferably made of plastic, secured by screws or rivets 11b to the internal part of the upright 11. Preferably, the interfaces 11a can be provided in several versions, so that frames of the same type can be matched up with upper mechanisms 20 of different types, simply by using interfaces 11a of different and dedicated type. The interfaces 11a can also be of standardized type, so as to enable the installation of the same type of upper mechanism 20 on different types of frame 10. In one possible variant, however, the interfaces 11a for the connection of the elements 22 can be machined in the uprights 11, or welded to them. Similarly, the lower guides 47 (FIGS. 2-4) can also be welded to the lower cross beam 13 of the frame 10, or be machined with it.

Figure 24:
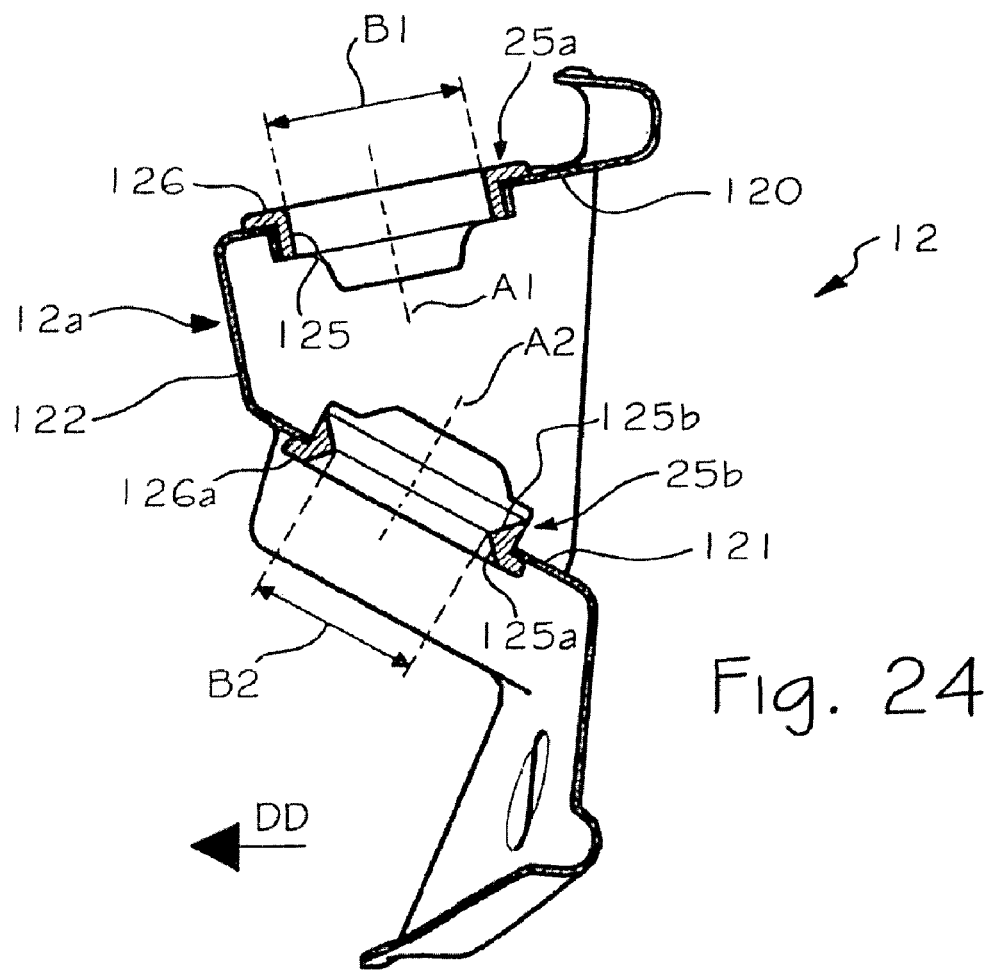
FIG. 24 is a schematic section of an upper cross beam of a seat back frame for use with the vehicle seat of advantageous use for purposes of implementing the invention.

From FIGS. 22 and 23, then, it is possible to note also the different positioning of the tubular elements 24 relative to the upper cross beam 12 of the frame 10, which is appropriately arranged to facilitate as much as possible the forward and upward movement of the elements 24. For this, FIG. 24 shows schematically the upper cross beam 12 of the frame 10, cross sectioned at one of the two pairs of bushings 25a, 25b.

As shown, the protuberance 12a of the cross beam 12 is defined by an upper wall 120 and a lower wall 121, lying essentially in respective general planes which, at the point of intersection, generate an acute angle. The two walls 120 and 121 are joined together by a front wall 122.

The walls 120, 121 have respective pairs of openings with oblong cross section in the direction of travel of the vehicle, to accommodate the respective bushings 25a, 25b. The axial passages of the bushings 25a and 25b also have an oblong cross section, particularly with two parallel lines joined to the respective ends by semicircular lines, as shown merely schematically in FIGS. 25 and 26.

Figure 25:
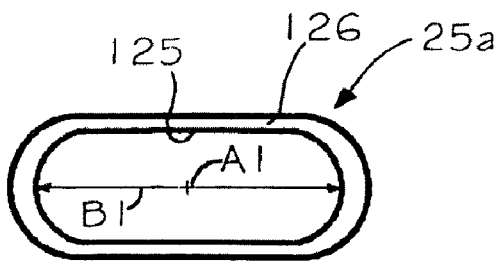
FIGS. 25 and 26 are schematic plan views of bushings of the cross beam of FIG. 24.
Figure 26:
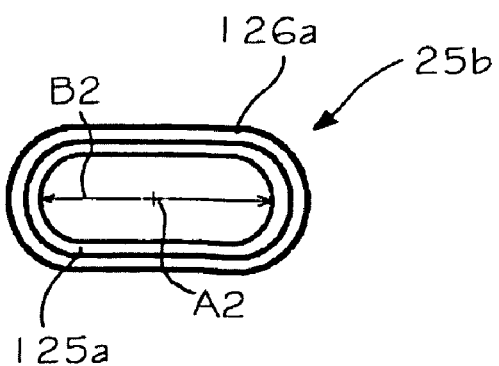

The central axes of the openings of the cross beam, i.e., the central axes of the openings of the bushings 25a and 25b, which are orthogonal to the walls 120 and 121, are not coincident or parallel, but instead make an inclination between them. In FIG. 24, the central axes of the openings of the bushings 25a and 25b, indicated by A1 and A2, respectively, are arranged so as to form between them an obtuse angle. In FIGS. 25 and 26 one notes how the largest length or dimension of the cross section of the oblong openings of the bushings is different, dimension B1 of the opening of the bushings 25a being larger than the homologous dimension B2 of the opening of the bushings 25b.

Also from FIG. 24 one notes how the opening of the bushings 25a is defined by a plane wall 125, essentially parallel to the axis A1. The bushings 25b, instead, have an opening whose wall is defined by two flared surfaces, designated by 125a and 125b, which converge onto a constricted section (essentially a cusp). The body of the bushings 25a, 25b, preferably shaped by molding of thermoplastic material, appropriately incorporates snap hook means with respect to the walls 120 and 121, respectively. These hook means preferably comprise elastic teeth, some of which are visible, for example, in FIG. 4. In the example, the bushings 25a are inserted from the top into the respective passages of the wall 120, while the bushings 25b are inserted from below into the respective passages of the wall 121, so that their flanged walls, indicated respectively as 126 and 126a, abut against the surface of the respective wall 120, 121 of the cross beam 12.

Figure 27:
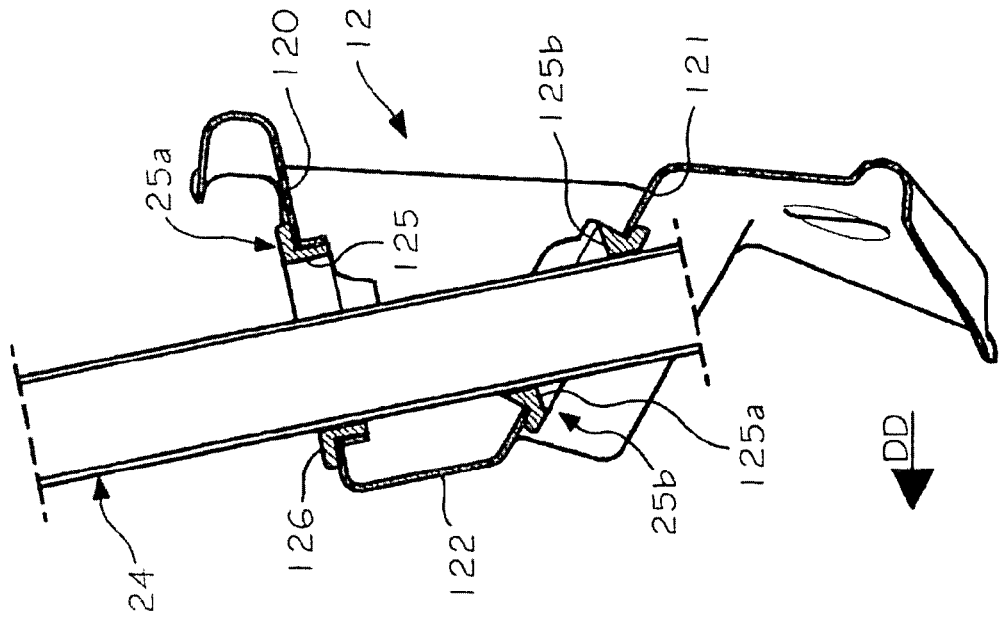
FIGS. 27 and 28 are schematic sections similar to those of FIG. 24, also showing a tubular support element of a headrest in two states corresponding to those of FIGS. 22 and 23.
Figure 28:
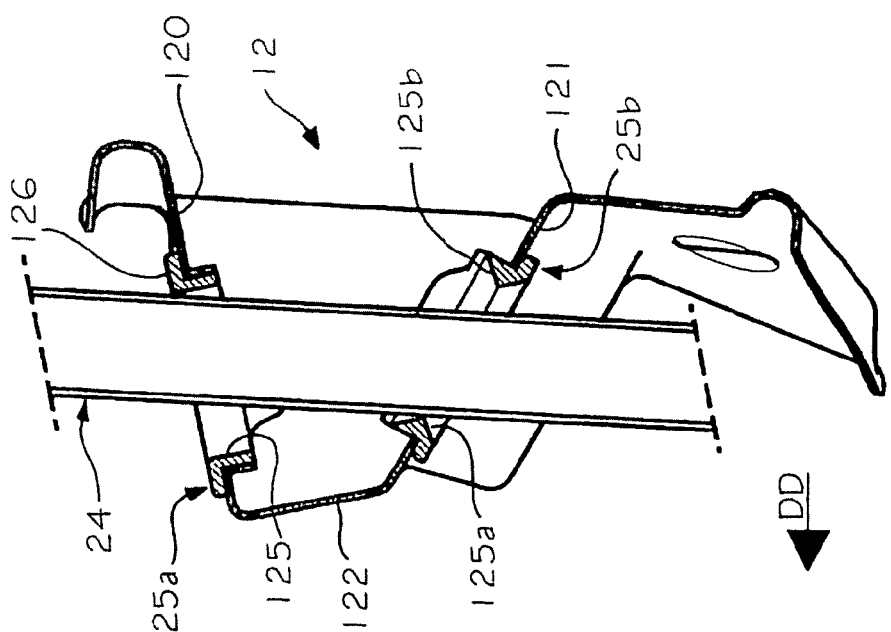

FIGS. 27 and 28 show, in partial and schematic fashion, using representations similar to that of FIG. 24, the relative positions between the tubular elements 24 and the upper cross beam 12 of the frame 10, in conditions corresponding to those of FIGS. 22 and 23, respectively.

As is seen, in the backed off or resting position of the active headrest system (FIG. 27), the tubular elements 24, passing through the openings of the two bushings 25a, 25b, are in contact with the bushings themselves in only two zones of tangency. One such zone is situated in the rear part of each bushing 25a (in terms of the direction of travel DD), at the corner formed between the flanged wall 126 of the bushing and the wall 125 of the respective opening. The other zone of tangency, meanwhile, is situated in the rear part of each bushing 25b, at the constricted section of the respective axial opening, i.e., the cusp or corner formed between the converging flared surfaces 125a and 125b, which can possibly have a slightly rounded profile. In the inactive or resting state of the system, the headrest is not normally under rearward stress, or rather it is stressed only by a slight pressure by the head of the seat occupant, so that the maintaining of the correct position is effectively guaranteed by its aforesaid zones of tangency or contact. Keep in mind that this state of rest is maintained thanks to the action exerted by the stress elements 23 (see, for example, FIG. 2).

On the other hand, as is seen in FIG. 28, due to the intervention of the active headrest system, each tubular element 24 bears against three different zones belonging to the bushings 25a and 25b. A first zone is provided by the surface 125 of the bushing 25a, in the front part of the latter (always with regard to the direction of travel DD), while the other two zones are both obtained in the bushing 25b. In particular, a second zone of support is provided by the surface 125a in the front part of the bushing 25b, while the third zone of support is provided by the surface 125b in the rear part of the bushing 25b. It will be appreciated that, in the end travel position of the forward movement of the upper mechanism 20, the surface of the tubular element 24 is essentially parallel to and in contact with respective portions of the surfaces defining the openings of the bushings. In this way, a precise and certain end of travel is assured for the tubular elements 24, even after the violent stress causing the intervention of the active headrest system.

Of course, the described function can also be achieved by the general geometry selected for the kinematics, including the shape of the element 21 of the upper mechanism 20 and the position of its axis of rotation X, instead of by the conformation of the cross beam 12 and the relative arrangement and conformation of the bushings 25a, 25b.

It will also be appreciated that, in the end travel position, the tubular elements 24 will be essentially perpendicular to the plane described by the wall 126 of the upper bushing 25a, or perpendicular to the plane described by the wall 120 of the cross beam 12. Such a relative positioning is particularly advantageous when—according to one possible implementation of the invention—a device to lock the active headrest system in the particular active state is attached to the wall 120 of the cross beam 12, in a position intermediate to the bushings 25a. Such a locking device is described, for example, in the Italian patent application TO2006A000750, in the name of the same Applicant, the entire disclosure of which is hereby incorporated by reference.

Another advantage of the configuration proposed for the upper cross beam 12 of the frame 10 is that, in the course of the intervention of the active headrest system 20, 30, each tubular element 24 is always in contact with the front inside part of the respective lower bushing 25b (see FIGS. 27 and 28). This front part of the bushing therefore constantly identifies the region of sliding and rotation of the element 24 with respect to the cross beam 12, and this assures a heightened precision of movement of the system.

Another essential advantage is due to the fact that the zone of contact between the tubular elements 24 and the lower bushings 25b is always reduced, in the course of the passage from the position of FIG. 27 to that of FIG. 28, thanks to the conformation of the wall 125a-125b of the opening of the lower bushings 25b, whose constricted cross section is represented essentially by a cusp: this has the consequence that the friction of the upward travel of each element 24 in the respective bushing 25b is minimized, with a consequent advantage in terms of speed of movement of the elements themselves, and therefore the speed of intervention of the system.

The upper cross beam 12 of the frame previously described can also be used advantageously in connection with active headrest systems containing only an upper mechanism, or also containing a lumbar support of configuration different from the one previously described.

The description which has been given clearly reveals the characteristics and the advantages of the present invention. In the described active headrest system, the lumbar support device 30 makes it possible to increase the ergonomics and comfort of the general functioning. As already pointed out above, the element 31 of horizontal lengthwise dimension has a largely adaptive function, adapting itself optimally to the back of the occupant and for greater length than that made possible by the solution described in U.S. Pat. No. 7,044,544. This particular conformation also has the advantage of allowing a better distribution of the potential impact force on the lumbar support and, consequently, a more precise and swift intervention of the active headrest system. Also, the solution of providing the support structure of the lumbar element with one or more molded bodies to define positioning locators with respect to the lower guides makes it possible to further heighten the precision and the efficiency of functioning of the active headrest system. The lumbar support device is of simple and economical implementation in itself, being characterized by a number of components which are themselves elementary in their implementation and readily available. The proposed solution is extremely flexible, given that the same basic components of the device can be used to make either adjustable lumbar supports or fixed lumbar supports. The proposed configuration for the frame, and especially its upper cross beam, allows for further increase in the efficiency of the system, in terms of precision and speed of intervention.

It is clear that many variants are possible by the practitioner for what has been described as an example, without thereby leaving the scope of the present invention, as is defined in the attached claims. The scope of the invention also includes vehicle seats which come with an active headrest system having the innovative features described and illustrated, as well as vehicle seats, and especially their frame, configured for combination with an active headrest system.

Possibly the pair of bushings 25a, 25b for the same tubular element 24 could be defined by a single body, for example, one made of molded material. The embodiment of the bushings 25a, 25b as distinct components is considered to be preferable at present, for reasons of design simplicity and also to enable—as pointed out—the mounting of the lower bushings 25b from the bottom onto the wall 121 of the cross beam 12, which for the most part eliminates the risk that the bushings 25b could get loose from the respective passages in the course of the intervention of the active headrest system.

The function of the bushings 25a and/or the bushings 25b could possibly be achieved by appropriately profiling the edges of the passages present in the walls 120 and 121 of the metal cross beam 12. The providing of bushings 25a, 25b is considered to be preferable at present, for reasons of design simplicity and also because it prevents noise created by metal on metal contact between the cross beam 12 and the tubular elements 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat, comprising a seat back having a seat back frame and an active headrest system, the active headrest system comprising:
   an upper mechanism which is supported in movable manner by the seat back frame and includes a headrest and a first impact body, the upper mechanism being actuatable to move in response to an impact force applied to the first impact body to move the headrest toward an occupant of the seat;
   a lower mechanism operatively connected to the upper mechanism, the lower mechanism being actuatable to move in response to an impact force applied to it, to interact with the upper mechanism in order to move the headrest toward the occupant of the seat;
   a guide means to support in guided manner the lower mechanism relative to the seat back frame, so that during use the lower mechanism is displaced with respect to the frame in a predetermined direction, in response to an impact force applied to the lower mechanism, so as to move the headrest toward the occupant of the seat;
   the lower mechanism including a lumbar support device which includes a lumbar support element having an intermediate part and two lateral parts, in which
   each lateral part is configured to be hinged to a support structure of the lumbar support element;
   each lateral part is connected to the intermediate part by a respective flexible part with longitudinal flexibility for shortening or lengthening in a side-to-side lateral direction with respect to the seat; and
   the lumbar support device further includes an interconnection of the two lateral parts, to maintain in a respective operating position the lumbar support element.

2. The vehicle seat of claim 1, wherein the lumber support element is arranged such that the operating position can be modified by a user among a plurality of possible adjustment positions, or the lumbar support element can be installed in the operating position among a plurality of possible fixed and alternative installation positions; and
   the intermediate part is arranged to have, when viewed in longitudinal section, the same configuration in any given operating position of adjustment or installation of the lumbar support element.

3. The vehicle seat of claim 2, wherein the intermediate part is shaped as a predominantly flat plate which, in any said operating position of adjustment or installation, lies in a respective general plane.

4. The vehicle seat of claim 1, wherein each flexible part is configured so as to also be capable of a reversible bending.

5. The vehicle seat of claim 1, wherein the lateral parts, the intermediate part and the flexible parts are integrated in a single piece of material.

6. The vehicle seat of claim 1, wherein each of the lateral parts has a respective hinge element molded as one piece with the respective lateral part.

7. The vehicle seat of claim 6, wherein the hinge elements each comprise a hook element able to engage in rotary fashion with one rod piece, each hook element having opposing hook surfaces between which a respective rod piece can be accommodated.

8. The vehicle seat of claim 1, wherein the support structure comprises rods secured together.

9. The vehicle seat of claim 1, wherein the support structure comprises at least two rod pieces, basically parallel to each other and extending longitudinally in the vertical direction, i.e., in a height direction of the seat back.

10. The vehicle seat of claim 9, wherein the two rod pieces belong to a same support rod having a plurality of bends.

11. The vehicle seat of claim 9, wherein the support structure furthermore contains support means at least partly extending in the vertical direction, i.e., in a height direction of the seat back, the support means propping up the rod pieces.

12. The vehicle seat of claim 11, wherein the support means includes two spaced and parallel first rod pieces, and the support means also includes two spaced and parallel second rod pieces that are also spaced and parallel to the first rod pieces, and the distance between the first rod pieces being less than the distance between the second rod pieces.

13. The vehicle seat of claim 11, wherein the support means are arranged for connection, in a respective upper region, to a movable element of the active headrest system.

14. The vehicle seat of claim 13, wherein the support means are arranged for coupling, in a respective lower region, to first guide means located in a fixed position relative to a frame of the seat back, the coupling being such that, after an impact force is applied to the lumbar support element, the support means undergo a displacement relative to the first guide means and consequently cause a displacement of the movable element able to produce an activation of the active headrest system.

15. The vehicle seat of claim 14, wherein the support means contain at least one guided element designed to cooperate with a respective cam surface belonging to the first guide means.

16. The vehicle seat of claim 15, wherein two such guided elements are provided, axially aligned and spaced apart, defined by the same rod.

17. The vehicle seat of claim 1, wherein the support structure is operatively connected to the active headrest system of the seat back, such that, after an impact force is applied to the lumbar support element, at least part of the support structure undergoes a displacement able to cause an activation of the active headrest system.

18. The vehicle seat of claim 1, wherein the support structure contains at least one metal element on which is molded a body of plastic material.

19. The vehicle seat of claim 1, wherein the interconnection of the two lateral parts includes a flexible element.

20. The vehicle seat of claim 19, wherein the lumbar support element can be installed in one fixed installation position and the flexible element comprises a wire having two ends, each of which is connected to a respective lateral part.

21. The vehicle seat of claim 20, wherein a segment of the wire which is intermediate to the lateral parts passes through a respective piece of sheath having two ends connected to the lumbar support element.

22. The vehicle seat of claim 19, wherein the operating position of the lumbar support element can be adjusted by a user and the flexible element comprises a cable of Bowden type, having an external sheath connected to one of the lateral parts and a wire connected to the other lateral part, the cable being operable to stress the lateral parts toward each other so as to cause their angular movement about respective axes of rotation, with a consequent reversible deformation of the longitudinal extension of the flexible parts.

23. The vehicle seat of claim 1, wherein the intermediate part of the lumbar support element has an upper extension and a lower extension, the lumbar support element having a cross shaped profile overall.

24. The vehicle seat of claim 23, wherein each of the extensions has respective hinge elements for rotary connection to the support structure of the lumbar support element, the extensions being able to turn about respective axes essentially parallel to each other and perpendicular to the axes of rotation of the lateral parts of the lumbar support element.

25. The vehicle seat of claim 1, wherein the guide means include
at least one guide associated with the seat back frame and having a cam surface which extends generally upward relative to the seat back frame;
the support structure of the lumbar support element including at least one guided element supported on the cam surface in such a way that, during use, the lumbar support device moves relative to the frame in a generally upward direction in response to an impact force applied to the lumbar support device.

26. The vehicle seat of claim 25, wherein the at least one guided element belongs to a metal body on which is molded a body of plastic material, the body of plastic material being shaped so as to define at least one positioning locator of the guided element with respect to the respective guide to maintain a correct general axis of displacement of the lower mechanism when an impact force is applied to it.

27. The vehicle seat of claim 1, wherein the support structure contains at least one transfer rod operatively connected to the upper mechanism and to the guide means.

28. The vehicle seat of claim 27, wherein to the transfer rod is fastened at least one other rod, having at least one rod piece extending in a direction essentially parallel to the transfer rod, there being coupled to the rod piece one hinge element of a respective lateral part of the lumbar support element.

29. The vehicle seat of claim 1, wherein the first impact body of the upper mechanism supports two parallel tubular elements to support the headrest, and where
the seat back frame has an upper cross beam which includes an upper wall and a lower wall lying in respective general planes making an acute angle between them, the upper wall having a pair of upper openings and the lower wall having a pair of lower openings, the upper openings and the lower openings having an oblong cross section, one tubular element being designed to be received with possibility of movement through one upper opening and a subjacent lower opening; and
wherein the upper and lower openings are configured and positioned so that, when the seat is in use and the active headrest system is in an inactive position, the tubular element is essentially tangent to a rear region of the respective upper opening and to a front region of the respective lower opening.

30. The vehicle seat of claim 29, wherein the upper and lower openings are configured and positioned so that, when the seat is in use and the active headrest system is in an active position, the tubular element is in contact with a front region of the respective upper opening, with a front region of the respective lower opening and with a rear region of the respective lower opening.

31. The vehicle seat of claim 29, wherein the upper and lower openings are configured and positioned such that, when the seat is in use and when the active headrest system is changing from an inactive position to an active position, the tubular element is constantly in contact with a front region of the respective lower opening, particularly a region which belongs to a constricted cross section of the opening.

32. The vehicle seat of claim 29, wherein the upper and lower openings are configured and positioned such that, when the seat is in use and when the active headrest system is changing from an inactive position to an active position, the tubular element can slide on a front region of the respective lower opening that belongs to a constricted cross section of the opening.

33. The vehicle seat of claim 29, wherein the upper openings and the lower openings are defined by respective bushing elements mounted in holes passing through the upper and lower wall, respectively, of the cross beam.

34. The vehicle seat according to claim 1, wherein the seat back frame has two lateral uprights, an upper cross beam and a lower cross beam, each upright having a respective connection component for a respective articulation element of the impact body and the lower cross beam having at least one guide.

35. The vehicle seat of claim 34, wherein the connection component is of plastic material and is joined to the uprights.

36. The vehicle seat of claim 34, wherein the connection component is of metal material.

37. The vehicle seat of claim 34, wherein each guide is integrated with the lower cross beam.

38. The vehicle seat according to claim 1, wherein the seat back frame has two lateral uprights, an upper cross beam and a lower cross beam, the frame being configured to support a movable mechanism of an active headrest system of the type comprising a movable element designed to be articulated to the two lateral uprights and supporting two parallel tubular elements for the support of a headrest; wherein
the upper cross beam of the frame includes an upper wall and a lower wall, the upper wall having a pair of upper openings and the lower wall having a pair of lower openings, the upper openings and the lower openings having an oblong cross section, and one tubular element is designed to be received with possibility of movement through one upper opening and one subjacent lower opening;
the upper and lower openings are configured and positioned such that, during use and in an active position of the active headrest system, the tubular element is in contact with a front region of the respective upper opening, with a front region of the respective lower opening and with a rear region of the respective lower opening.

39. The vehicle seat of claim 38, wherein the upper openings and the lower openings are defined by respective bushing elements mounted in holes passing through the upper and lower wall, respectively, of the cross beam.

40. The vehicle seat of claim 38, wherein the upper and lower openings are configured and positioned such that, during use and in an inactive position of the active headrest system, the tubular element is basically tangent to a rear region of the respective upper opening and to a front region of the respective lower opening.

41. The vehicle seat of claim 38, wherein the upper and lower openings are configured and positioned such that, during use and upon changing of the active headrest system from an inactive position to an active position, the tubular element is constantly in contact with a front region of the respective lower opening.

42. The vehicle seat of claim 38, wherein the upper and lower openings are configured and positioned such that, during use and upon changing of the active headrest system from an inactive position to an active position, the tubular element can slide on a front region of the respective lower opening belonging to a constricted cross section of the opening.

43. The vehicle seat of claim 38, wherein the axis of an upper opening is inclined relative to the axis of the subjacent lower opening, the axes making an obtuse angle between them.

44. The vehicle seat of claim 38, wherein the upper wall and the lower wall of the upper cross beam lie in respective general planes making an acute angle between them.

45. The vehicle seat of claim 38, wherein each upper opening is defined by a wall with essentially planar surface.

46. The vehicle seat of claim 38, wherein each lower opening contains a cross section constricted essentially in a cusp or corner.

47. The vehicle seat of claim 38, wherein each lower opening is defined by a wall having two flared surfaces converging onto a constricted cross section.

48. The vehicle seat of claim 38, wherein the cross section of the openings has a length dimension and a width dimension, the length dimension of the upper openings being greater than the length dimension of the lower openings.

49. A vehicle seat, comprising a seat back having a seat back frame and an active headrest system, the active headrest system comprising:
   an upper mechanism which is supported in movable manner by the seat back frame and includes a headrest and a first impact body, the upper mechanism being actuatable to move in response to an impact force applied to the first impact body to move the headrest toward an occupant of the seat;
   a lower mechanism operatively connected to the upper mechanism, the lower mechanism being actuatable to move in response to an impact force applied to it, to interact with the upper mechanism in order to move the headrest toward the occupant of the seat;
   guide means to support in guided manner the lower mechanism relative to the seat back frame, the guide means comprising
   two parallel guides associated with the seat back frame; and
   at least one guided element, preferably at least two guided elements, spaced apart and axially aligned with each other, each guided element belonging to the lower mechanism and being operatively engaged with one guide in such a way that, during use, the lower mechanism undergoes a displacement relative to the frame in a predetermined direction in response to an impact force applied to the lower mechanism, so as to move the headrest toward the occupant of the seat; and
   wherein the at least one guided element has a body of metallic material on which is molded a body of plastic material, the body of plastic material being shaped so as to define at least one positioning locator for the guided element with respect to the respective guide to maintain an axis of displacement during displacement of the lower mechanism.

50. The vehicle seat of claim 49, wherein the lower mechanism has two guided elements, spaced apart and axially aligned with each other, the two guided elements being defined by the same body of metallic material, on which is molded the body of plastic material, which is shaped so as to define at least one positioning locator for each of the two guided elements.

51. The vehicle seat of claim 50, wherein the same body of metallic material is comprised of a rod, in an intermediate region of which is molded the body of plastic material.

52. An active headrest system for a vehicle seat, comprising
   an upper mechanism designed to be supported in movable manner by a seat back frame and including a headrest and a first impact body;
   a lower mechanism operatively connected to the upper mechanism, the lower mechanism being actuatable to move in response to an impact force applied to it, to interact with the upper mechanism in order to move the headrest toward an occupant of the seat;
   guide means to support in guided manner the lower mechanism with respect to the seat back frame, so that during use the lower mechanism undergoes a displacement relative to the frame in a predetermined direction, in response to an impact force applied to the lower mechanism, in order to move the headrest toward the occupant of the seat;
   where the lower mechanism contains a lumbar support device which includes a lumbar support element having an intermediate part and two lateral parts, wherein
   each lateral part is configured to be hinged to a support structure of the lumbar support element;
   each lateral part is connected to the intermediate part by a respective flexible part with longitudinal flexibility, i.e., its longitudinal extension can be changed in reversible manner;
   the lumbar support device further contains means of interconnection of the two lateral parts, to maintain the lumbar support element in a respective operating position.

* * * * *